United States Patent
Iwai et al.

(10) Patent No.: US 11,285,864 B2
(45) Date of Patent: *Mar. 29, 2022

(54) IN-VEHICLE LIGHT APPARATUS

(71) Applicant: PANASONIC INTELLECTUAL PROPERTY MANAGEMENT CO., LTD., Osaka (JP)

(72) Inventors: Hiroshi Iwai, Osaka (JP); Ryosuke Shiozaki, Tokyo (JP); Shuji Akamatsu, Tokyo (JP); Osamu Shibata, Hyogo (JP); Ken Takahashi, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/202,670

(22) Filed: Mar. 16, 2021

(65) Prior Publication Data

US 2021/0197707 A1    Jul. 1, 2021

Related U.S. Application Data

(63) Continuation of application No. 16/926,320, filed on Jul. 10, 2020, now Pat. No. 10,981,491, which is a (Continued)

(30) Foreign Application Priority Data

Sep. 28, 2018 (JP) .............. JP2018-183699
Sep. 28, 2018 (JP) .............. JP2018-183702
(Continued)

(51) Int. Cl.
*B60Q 1/04* (2006.01)
*H01Q 1/44* (2006.01)
(Continued)

(52) U.S. Cl.
CPC ............... *B60Q 1/04* (2013.01); *F21S 41/30* (2018.01); *G01S 13/931* (2013.01);
(Continued)

(58) Field of Classification Search
CPC .......... B60Q 1/04; F21S 41/30; G01S 13/931; G01S 2013/93277; H01Q 1/3291; H01Q 1/44

See application file for complete search history.

(56) References Cited

U.S. PATENT DOCUMENTS 5,430,450 A    7/1995 Holmes
8,970,423 B2    3/2015 Kabrt
(Continued)

FOREIGN PATENT DOCUMENTS

EP    2141048    1/2010
JP    8-29535    2/1996
(Continued)

OTHER PUBLICATIONS

Official Action in Japanese Patent Application No. 2018-183699 dated Nov. 4, 2021, along with English translation thereof.
(Continued)

*Primary Examiner* — Mary Ellen Bowman
(74) *Attorney, Agent, or Firm* — Greenblum & Bernstein, P.L.C.

(57) ABSTRACT

A light apparatus mounted on a vehicle includes a lamp unit having: a first cover, and a light source that emits light through a first cover into a predetermined area including a first direction. The light apparatus also includes: a radar unit provided on a lower side or an upper side of the lamp unit, and a separator provided between the lamp unit and the radar unit. The radar unit includes: a circuit board having a board surface arranged in a substantially horizontal state, and an antenna unit that transmits an electromagnetic wave in a
(Continued)

range including a second direction different from the first direction and that receives a reflected wave from an object existing outside the vehicle. The antenna unit is arranged in the board surface.

13 Claims, 34 Drawing Sheets

Related U.S. Application Data continuation of application No. 16/585,061, filed on Sep. 27, 2019, now Pat. No. 10,744,926.

(30) Foreign Application Priority Data

Sep. 28, 2018 (JP) ............................. JP2018-183711
Sep. 28, 2018 (JP) ............................. JP2018-183715

(51) Int. Cl.
*H01Q 1/32* (2006.01)
*F21S 41/30* (2018.01)
*G01S 13/931* (2020.01)

(52) U.S. Cl.
CPC ............. *H01Q 1/3291* (2013.01); *H01Q 1/44* (2013.01); *G01S 2013/93277* (2020.01)

(56) References Cited

U.S. PATENT DOCUMENTS

| | | | |
|---|---|---|---|
| 10,744,926 B2* | 8/2020 | Iwai | ..................... H01Q 1/3291 |
| 10,981,491 B2* | 4/2021 | Iwai | ......................... B60Q 1/04 |
| 2001/0012206 A1 | 8/2001 | Hayami et al. | |
| 2004/0052083 A1 | 3/2004 | Daicho | |
| 2008/0180965 A1 | 7/2008 | Nakamura et al. | |
| 2011/0025209 A1 | 2/2011 | Nakanishi | |
| 2011/0279304 A1 | 11/2011 | Yonemoto | |

FOREIGN PATENT DOCUMENTS

| | | |
|---|---|---|
| JP | 10-48332 | 2/1998 |
| JP | 2001-213227 | 8/2001 |
| JP | 2002-62352 | 2/2002 |
| JP | 2006-186740 | 7/2006 |
| JP | 2008-186741 | 8/2008 |

OTHER PUBLICATIONS

English translation of Japanese Office Action issued in corresponding Japanese patent application No. 2018-183711 dated Jan. 4, 2022.

* cited by examiner

IN-VEHICLE LIGHT APPARATUS

CROSS REFERENCE TO RELATED APPLICATIONS

The present application is a continuation application of U.S. patent application Ser. No. 16/926,320 filed Jul. 10, 2020, which is a continuation application of U.S. patent application Ser. No. 16/585,061 filed Sep. 27, 2019, which claims the benefit of Japanese Patent Application Numbers 2018-183699 filed Sep. 28, 2018, 2018-183702 filed Sep. 28, 2018, 2018-183711 filed Sep. 28, 2018, and 2018-183715 filed Sep. 28, 2018. The disclosures of each application are expressly incorporated herein by reference in their entireties.

TECHNICAL FIELD

The present disclosure relates to an in-vehicle light apparatus.

BACKGROUND ART

In the related art, an in-vehicle light apparatus provided with a millimeter wave radar (hereinafter, referred to as "radar apparatus") integrally with a lamp (for example, a headlight or a backlight) for irradiating outside the vehicle is known (for example, see PTL1).

Such an in-vehicle light apparatus is suitable for saving a space for installing the millimeter wave radar and improving the design of the vehicle body.

CITATION LIST

Patent Literature

PTL 1
Japanese Patent Application Laid-Open No. 2008-186741

SUMMARY OF INVENTION

The present disclosure which solves the problems mentioned above is an in-vehicle light apparatus for monitoring a region in a first direction outside a vehicle, the in-vehicle light apparatus including:

a lamp unit including: a light source that emits light in the first direction; and a reflector surrounding the light source; and a radar unit provided on a lower side or an upper side of the lamp unit, the radar unit including: a circuit board disposed such that a board surface extends substantially along a horizontal direction; and a plurality of antenna elements disposed in the board surface of the circuit board to transmit an electromagnetic wave in the first direction and to receive a reflected wave thereof, in which the plurality of antenna elements are arranged in an array on a side of the first direction relative to the reflector in plan view, and an array direction of the plurality of antenna elements is a direction intersecting the first direction and non-parallel to an extending direction of an end portion on the side of the first direction of the reflector in plan view.

According to an in-vehicle light apparatus according to an example of the present disclosure, it is possible to suppress deterioration of radar performance caused by multiple reflections with an integrated radar and lamp configuration.

DESCRIPTION OF EMBODIMENTS

Figure 1A:
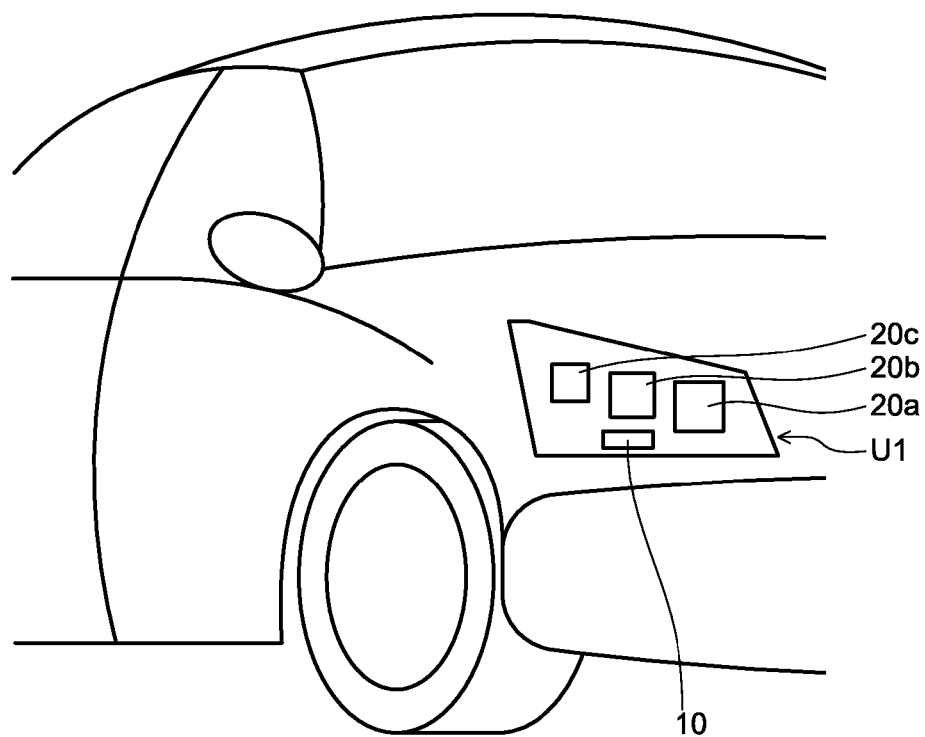
FIG. 1A is a perspective view illustrating a state of installation of a light apparatus in a vehicle according to Embodiment 1.
Figure 1A:
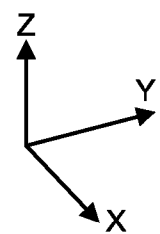

In the following, preferred embodiments of one example of the present disclosure will be described in detail with reference to the accompanying drawings. In the present specification and drawings, components having substantially the same function are denoted by the same reference numerals, and redundant description will be omitted.

Embodiment 1

In an in-vehicle light apparatus of the related art, a radar apparatus and a reflector of a lamp (a reflective member configured to condense a light emitted from a light source and adjust an irradiation range of the light) are placed close to each other. Therefore, in this type of in-vehicle light apparatus, the electromagnetic wave transmitted from the radar apparatus and reflected by and returned from the target may be re-reflected by the reflector and arrive at the antenna of the radar apparatus.

In particular, the reflector reflects not only the light emitted from the light source but also radio waves used in radar apparatus and the like. The reflector is a reflective member with a wide planar area, but when the radar apparatus and the reflector are placed close to each other, the reflection at the end of the reflector has the greatest effect. This may cause multiple reflections to and from the radar apparatus and the like where the antenna is disposed, which may generate standing waves between itself and the antenna. The standing wave causes fading of an electromagnetic wave arriving at the antenna, and the target detection performance is degraded in the reception characteristics of the antenna.

In view of the above-mentioned problems, an example of the present disclosure provides an in-vehicle light apparatus capable of suppressing deterioration of radar performance due to multiple reflections while integrating a radar apparatus and a lamp.

Hereinafter, referring to FIG. 1A, FIG. 1B, FIG. 1C, FIG. 2, FIG. 3 and FIG. 4, an example of the configuration of the in-vehicle light apparatus according to Embodiment 1 (hereinafter abbreviated as "light apparatus") will be described. The light apparatus according to Embodiment 1 is applied to a headlight configured to illuminate the front of the vehicle. Note that only the configuration of a headlight on the right front of the vehicle will be described.

In each drawing, in order to clarify the positional relationship in each configuration, a common orthogonal coordinate system (X, Y, Z) is illustrated with reference to a forward direction in which the radar apparatus (corresponding to a radar unit of the present disclosure) transmits the electromagnetic wave to the outside the apparatus (that is, the direction of detection of an object). In the following description, a plus direction of the X-axis represents the forward in which the radar apparatus transmits an electromagnetic wave to the outside the apparatus (hereinafter referred to as "forward direction" or "first direction"), a plus direction of the Y-axis represents the left side of the radar apparatus (hereinafter abbreviated as "leftward direction") and a plus direction of the Z-axis represents upward of radar apparatus (hereinafter abbreviated as "upward direction").

In the following description, +Z direction corresponds to the upward of the vehicle, and a direction about 30 degrees in the +Y direction from +X direction corresponds to the direction of travel of the vehicle.

Figure 1B:
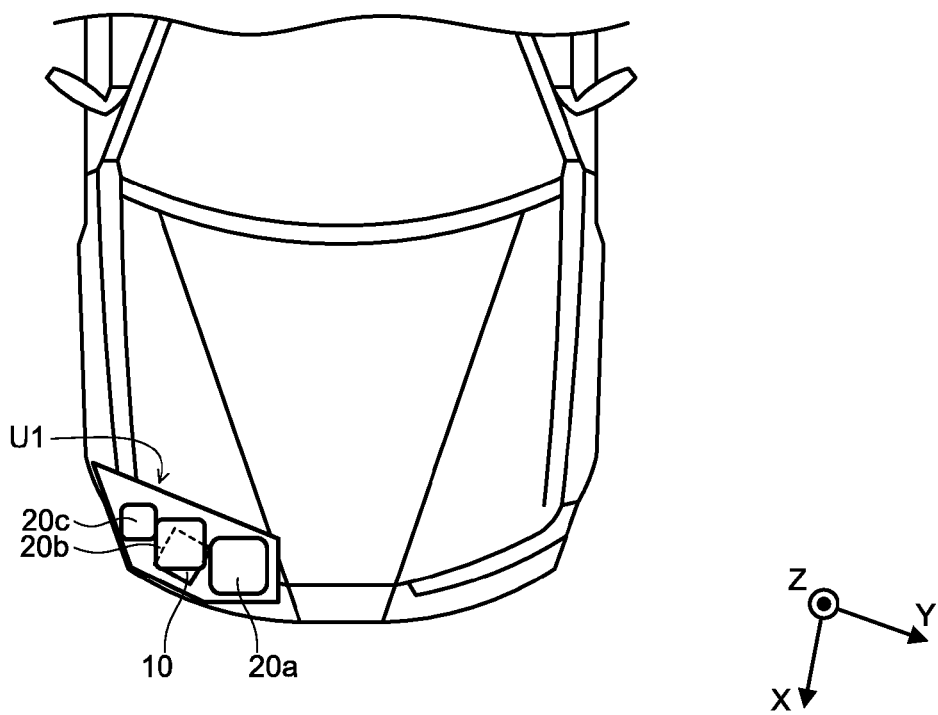
FIG. 1B is a plan view illustrating the state of installation of the light apparatus in the vehicle according to Embodiment 1.
Figure 1C:
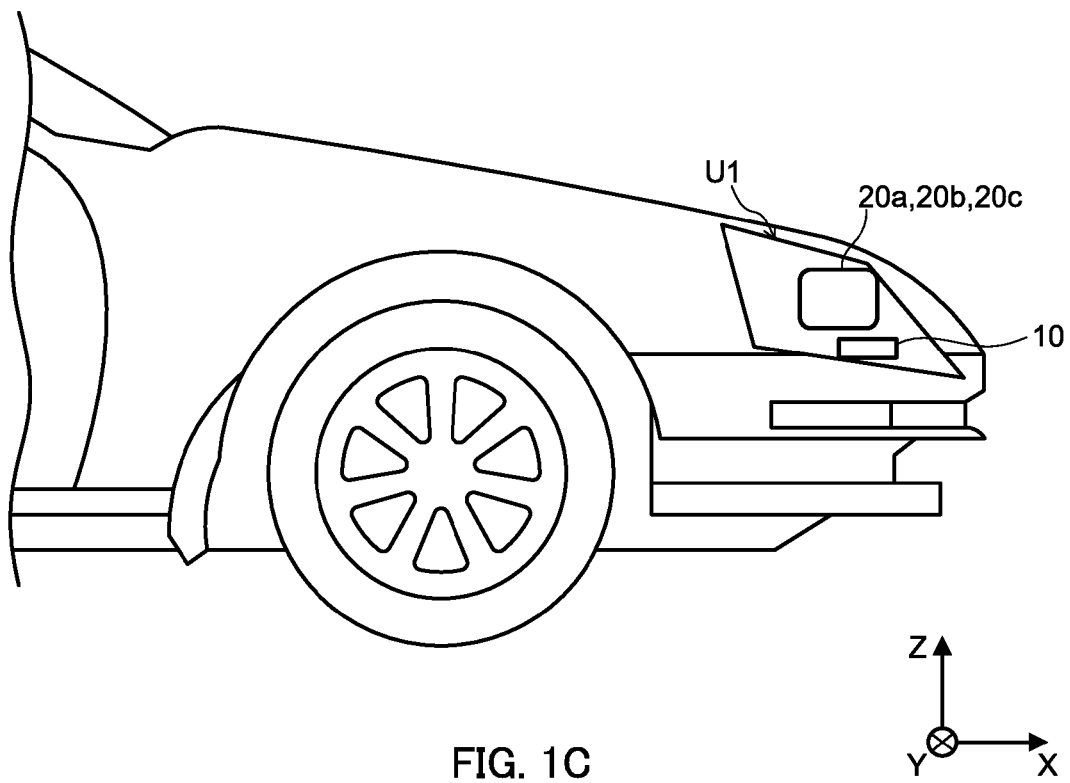
FIG. 1C is a front view illustrating the state of installation of the light apparatus in the vehicle according to Embodiment 1.

FIG. 1A is a perspective view illustrating a state of installation in the vehicle of light apparatus U1 according to Embodiment 1. FIG. 1B is a plan view illustrating a state of installation in the vehicle of light apparatus U1 according to Embodiment 1. FIG. 1C is a front view illustrating a state of installation in the vehicle of light apparatus U1 according to Embodiment 1.

Light apparatus U1 according to Embodiment 1 includes radar unit 10, lamp units 20a, 20b, and 20c, and housing 30.

In light apparatus U1 according to this embodiment, three lamp units 20a, 20b, and 20c are arranged adjacent along the left-right direction, and radar unit 10 is disposed on a lower side of lamp units 20a, 20b, and 20c.

Radar unit 10 according to Embodiment 1 transmits an electromagnetic wave obliquely rightward (+X direction) with respect to the direction of travel of the vehicle, and performs detection of an object present in the corresponding direction. Then, a radar unit (not illustrated) built in the left headlight performs detection of an object present obliquely leftward with respect to the direction of travel of the vehicle.

Figure 2:
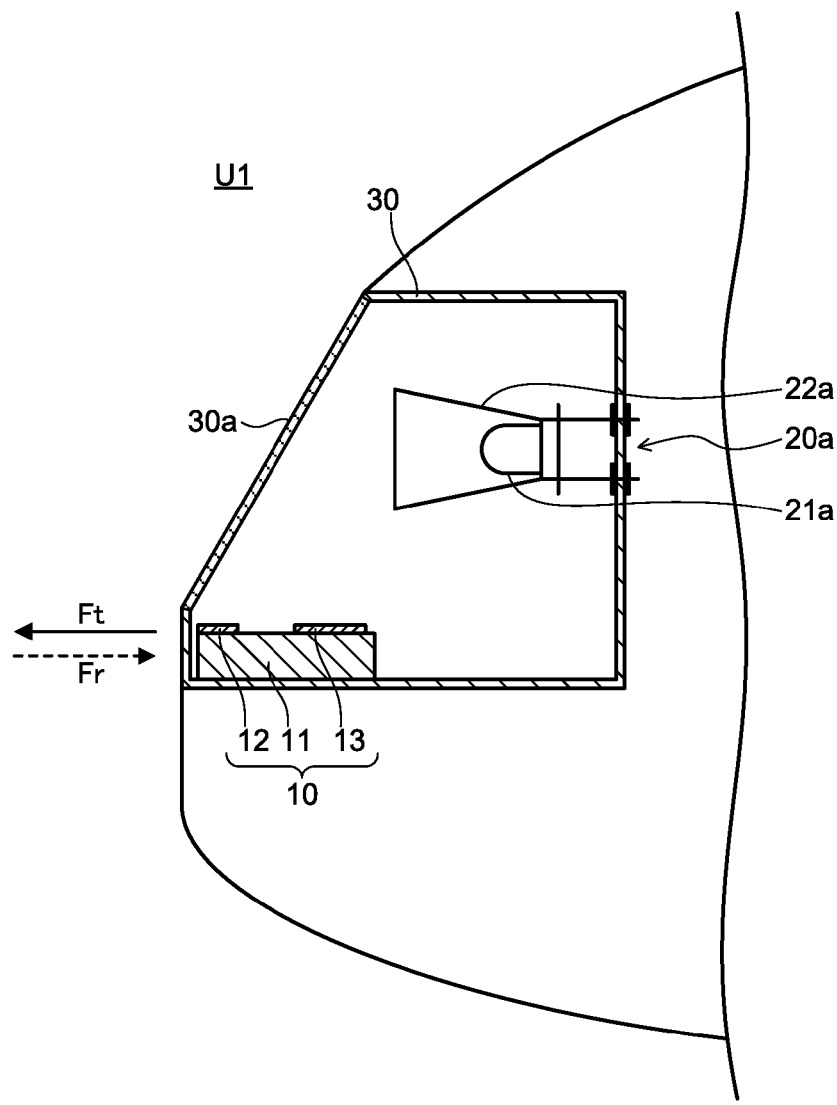
FIG. 2 is a sectional side view illustrating an example of a configuration of the light apparatus according to Embodiment 1.
Figure 3:
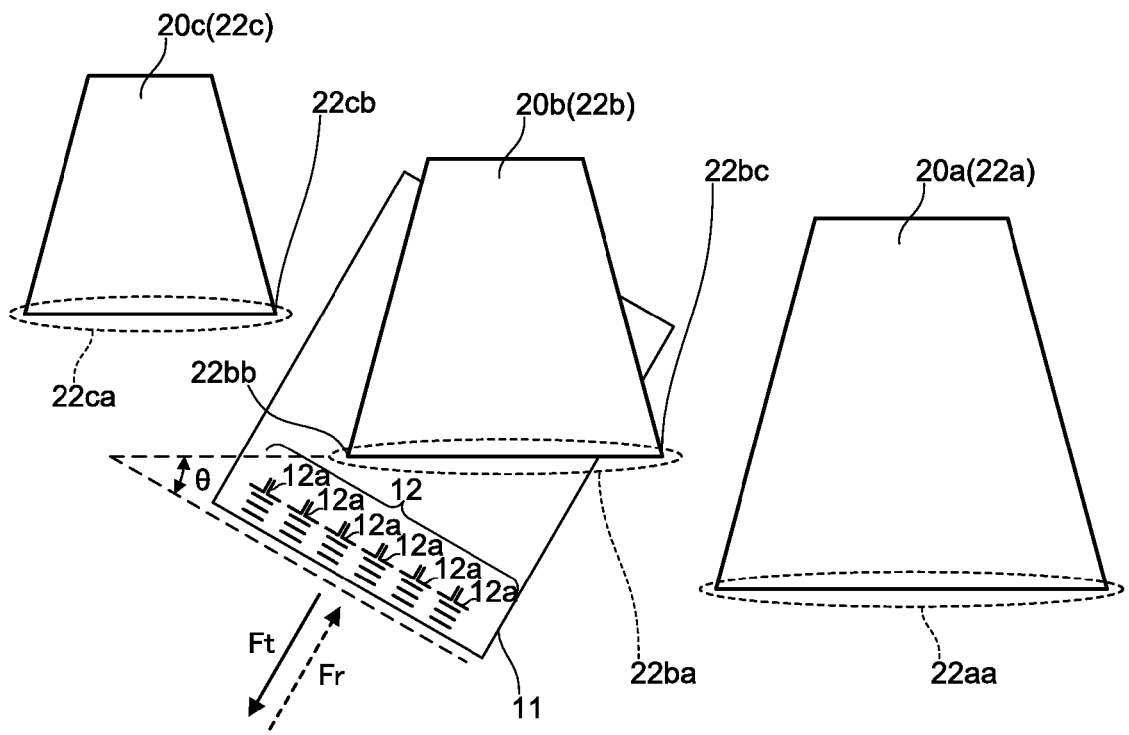
FIG. 3 is a plan view illustrating a positional relationship of a radar unit and a lamp unit of the light apparatus according to Embodiment 1.
Figure 4:
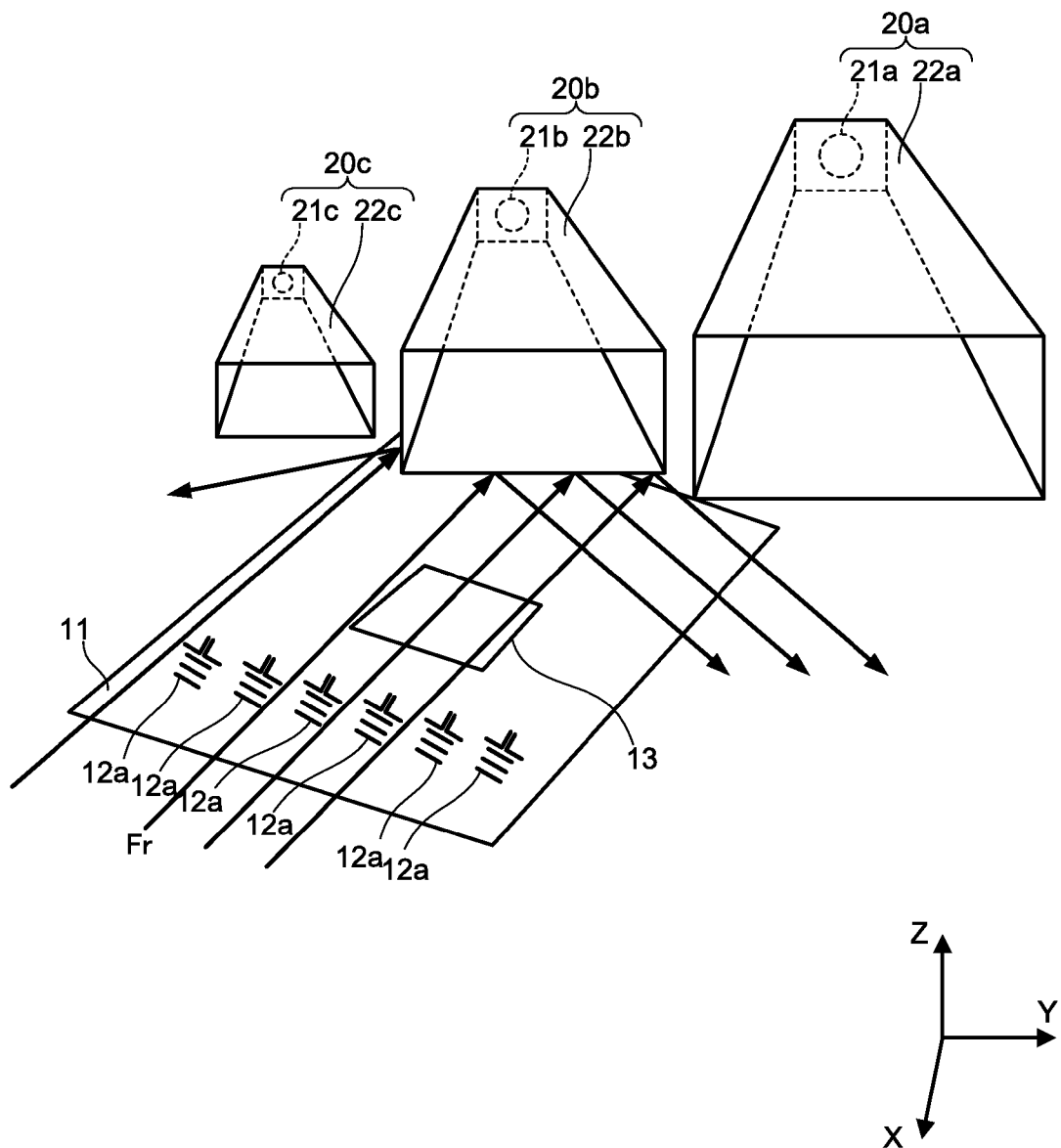
FIG. 4 is an upper perspective view illustrating a positional relationship of a radar unit and a lamp unit of the light apparatus according to Embodiment 1.

FIG. 2 is a sectional side view of light apparatus U1 according to this embodiment. FIG. 3 is a plan view illustrating a positional relationship between radar unit 10 and lamp units 20a, 20b, and 20c of light apparatus U1 according to Embodiment 1. FIG. 4 is an upper perspective view illustrating the positional relationship between radar unit 10 and lamp units 20a, 20b, and 20c of light apparatus U1 according to Embodiment 1.

Housing 30 forms a storage space in the front end region of the vehicle, and stores radar unit 10 and lamp units 20a, 20b, and 20c in the storage space. Housing 30 also has front cover 30a configured to cover the front face of the storage space. Housing 30 is made of, for example, a resin material (for example, polycarbonate and the like). Front cover 30a is made of, for example, a resin material having transparency to light (for example, polycarbonate and the like).

Lamp unit 20a includes light source 21a and reflector 22a.

Light source 21a is, for example, an LED lamp or an incandescent lamp, and emits light toward the front (in this case, a direction about 30 degrees to the −Y direction from +X direction). Light source 21a is attached to a rear side wall of housing 30. Note that a light source having a condensing lens may be used as light source 21a.

Reflector 22a is disposed so as to surround the periphery of light source 21a, collects light emitted from light source 21a, and adjusts an irradiation range of light. Reflector 22a is formed of, for example, a quadrangular pyramid-shaped cylindrical member having an opening directed toward the front side and increasing in opening diameter toward the front side. Reflector 22a is formed of a metal member such as an aluminum material, for example. Reflector 22a may be formed by metallizing a resin member.

Lamp units 20b and 20c have the same configuration as lamp unit 20a, and are made up of light sources 21b and 21c and reflectors 22b and 22c surrounding light sources 21b and 21c, respectively. Lamp units 20a, 20b, and 20c are equipped with a system that automatically shifts the headlight irradiation area, for example, called an adaptive high beam system.

Hereinafter, any one of lamp unit 20a, lamp unit 20b, and lamp unit 20c is abbreviated as "lamp unit 20", "light source 21", and "reflector 22" unless particularly distinguished.

Radar unit 10 includes circuit board 11, antenna 12, and signal processing IC 13.

Circuit board 11 is a board on which antenna 12 and signal processing IC 13 are mounted. As circuit board 11, for example, a Printed Circuit Board (PCB) substrate, a semiconductor substrate with built-in signal processing IC 13, or the like is used.

In view of miniaturization of light apparatus U1, circuit board 11 is disposed on the lower side of reflector 22 such that the board surface extends substantially along the horizontal direction. Here, "substantially along the horizontal direction" includes not only a state in which the board surface is completely horizontal to the ground but also a state in which the board surface is inclined with respect to the ground. Circuit board 11 may be disposed on the upper side of reflector 22.

In other words, radar unit 10 constitutes a horizontal type millimeter wave radar in which circuit board 11 is disposed horizontally. As a result, radar unit 10 is thinner than lamp unit 20 in the ±Z directions.

Antenna 12 is disposed in the front area of the board surface of circuit board 11 and transmits electromagnetic wave Ft forward (+X direction), and receives reflected wave Fr which is the electromagnetic wave reflected by a target.

Antenna 12 comprises, for example, an end-fire array antenna having directional characteristics in the direction of the front end side of circuit board 11. The end-fire array antenna is configured to include a plurality of strip conductors which are arranged such that the longitudinal direction thereof are in parallel, and transmits and receives electromagnetic waves along the direction in which the plurality of strip conductors are arranged.

Antenna 12 is composed of, for example, six end-fire array antennas (hereinafter also referred to as "antenna elements") 12a arranged in an array along ±Y direction. Antenna 12 is formed as a phased array antenna by six antenna elements 12a.

For example, signal processing IC 13 sends a high-frequency drive signal to antenna 12 to transmit an electromagnetic wave (for example, an electromagnetic wave in the millimeter wave band) from antenna 12, or performs reception processing for a received signal relating to a reflected wave received by antenna 12. Then, reception processing (for example, detection wave processing or frequency analysis processing) by signal processing IC 13 is performed to detect the distance to the target (for example, a vehicle or a person), the azimuth where the target is present, and other parameters such as the reflection intensity and speed of the target. Here, since the reception processing by signal processing IC 13 is the same as that of a known configuration, detailed description thereof is omitted here.

Radar unit 10 according to Embodiment 1 is configured to be housed in the same housing 30 as lamp unit 20, but may be housed in a radar housing separate from housing 30 and attached to housing 30. Further, a configuration in which a resin separator or the like is present between radar unit 10 and lamp unit 20 is also applicable.

Here, the details of the position of installation of antenna 12 in light apparatus U1 according to Embodiment 1 will be described with reference to FIG. 3 and FIG. 4.

Normally, the reflected wave transmitted from antenna 12 and reflected back by target arrives not only at the position of installation of antenna 12 but also at various positions around antenna 12. At this time, since reflector 22 is made of metal members, the reflected wave arriving at reflector 22 is re-reflected by reflector 22 and travels in various directions (hereinafter referred to as multiple reflected components of reflected waves"). In particular, the re-reflection occurs at front end portions 22aa, 22ba and 22ca of reflector 22.

Here, if the reflecting surface of reflector 22 and the board surface of circuit board 11 on which antenna 12 is disposed face each other, the multiple reflected components of the reflected wave will cause a standing wave between reflector 22 and antenna 12. Then, the standing wave is superimposed on the reflected wave that directly arrives at antenna 12 from the target, and a blind spot area in which the target cannot be detected is generated in the reception characteristics of antenna 12.

From such a point of view, antenna 12 according to Embodiment 1 is disposed on the front side (that is, the vehicle external side) relative to reflector 22. In other words, antenna 12 is arranged so as not to overlap with reflector 22 in plan view.

This prevents antenna 12 and reflector 22 from facing each other, thereby preventing the generation of the standing wave between antenna 12 and reflector 22.

In addition, the array direction of the plurality of antenna elements 12a, which constitutes antenna 12 of Embodiment 1 is a direction not in parallel to the extending direction of front end portions 22aa, 22ba, and 22ca of reflector 22 and intersecting a forward direction (±Y direction) in plan view. More preferably, the array direction of antenna 12 is set to have an angle ranging from 9 degrees to 171 degrees (angle θ in FIG. 3) with respect to the extending direction of front end portions 22aa, 22ba and 22ca of reflector 22 in plan view.

This makes it possible to reflect the reflected waves reaching the front end portions 22aa, 22ba and 22ca of reflector 22 so as to be directed toward the positive +Y direction or −Y direction, so that the reflected waves can be diffused away from the position of installation of antenna 12. In other words, it is possible to suppress the amount of the multiple reflected components of the reflected waves arriving at antenna 12.

The positional relationship between antenna 12 and reflector 22 is set such that, in a region in which circuit board 11 and reflector 22 overlap with each other in plan view, a position where the contour formed by front end portions 22aa, 22ba, and 22ca of reflector 22 is forwardly convex (the position of an edge portion 22bb of reflector 22b in FIG. 3) is closer to a central position of elements group of the plurality of antenna elements 12a (a position near third antenna element 12a from left most antenna element 12a among six antenna elements 12a in FIG. 3) than a position where the contour formed by front end portions 22aa, 22ba, and 22ca of reflector 22 is forwardly concave (positions of edge portions 22cb and 22bc of the reflector 22b in FIG. 3).

This makes the reflected waves arriving at front end portions 22aa, 22ba and 22ca of reflector 22 are diffused away from a position of installation of antenna 12 (in +Y direction or −Y direction here) when re-reflecting at front end portions 22aa, 22ba and 22ca of reflector 22. Reflected waves arriving at front end portions 22aa, 22ba, and 22ca of reflector 22 are reflected toward +Y direction or −Y direction, and the reflected waves are prevented from arriving at antenna 12.

(Advantageous Effect of One Example)

As described above, in-vehicle light apparatus U1 according to the Embodiment 1 includes lamp unit 20, including light source 21 configured to emit light to the front (first direction), reflector 22 surrounding light source 21, and radar unit 10 including circuit board 11 disposed on a lower side or an upper side of lamp unit 20 with the board surface extending horizontally, and a plurality of antenna elements 12a disposed in the board surface of circuit board 11 so as to transmit and receive electromagnetic waves to and from a region in the first direction. Further, the plurality of antenna elements 12a are arranged in an array in front of reflector 22 in plan view, the array direction of the plurality of antenna elements 12a is a direction intersecting the first direction and non-parallel to the extending direction of front end portions 22aa, 22ba, and 22ca of reflector 22 in plan view.

Accordingly, according to in-vehicle light apparatus U1 of Embodiment 1, the occurrence of a standing wave between reflector 22 and the portion of antenna 12 of circuit board 11 due to electromagnetic waves (multiple reflected components of the reflected wave) re-reflected by reflector 22 among the reflected waves from the target can be suppressed. This makes it possible to suppress the situation in which the multiple reflected components of the reflected waves are superimposed on the reflected waves coming directly from the target to antenna 12, thereby deteriorating the reception characteristics of antenna 12. In other words, it is possible to suppress the deterioration of the radar performances caused by the multiple reflections.

(Modifications of Embodiment 1)

The position of installation of antenna 12 may be varied depending on the shape of reflector 22.

Figure 5A:
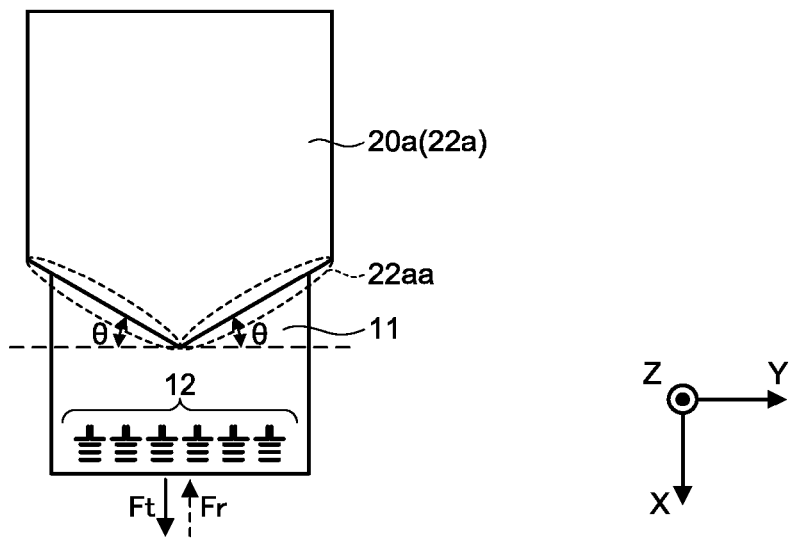
FIG. 5A is a drawing illustrating a position of installation of an antenna in a light apparatus according to Modification 1.
Figure 5B:
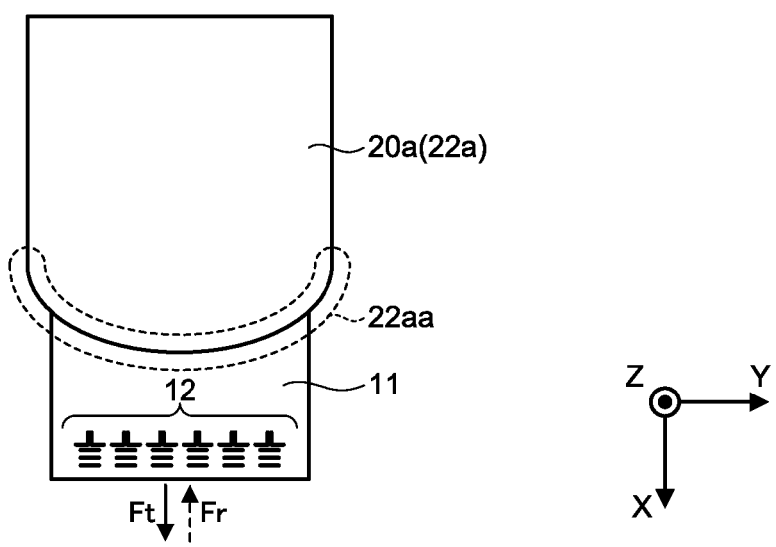
FIG. 5B is a drawing illustrating a position of installation of the antenna in the light apparatus according to Modification 2.

FIG. 5A is a drawing illustrating a position of installation of antenna 12 in light apparatus U1 according to Modification 1. FIG. 5B is a drawing illustrating a position of installation of antenna 12 in light apparatus U1 according to Modification 2. In FIGS. 5A and 5B, only lamp unit 20a among lamp units 20a, 20b, and 20c is illustrated.

Light apparatus U1 according to the Modification 1 and light apparatus U1 of Modification 2 has a mode configured such that radar unit 10 sets the direction of transmission and reception of the electromagnetic waves in the same direction as the direction in which lamp unit 20a irradiates light.

In this mode, when quadrangular pyramidal reflector 22a described in the above-described embodiment is used, the array direction of antenna 12 and the extending direction of front end portion 22aa of reflector 22a become parallel to each other, and many of the multiple reflected components of the reflected wave come to antenna 12.

From this point of view, in both light apparatus U1 of the Modification 1 and light apparatus U1 of Modification 2, front end portion 22aa of reflector 22a is formed in to a shape having a protrusion in the +X direction so that the extending direction of front end portion 22aa of reflector 22a is in a non-parallel state with the array direction of the antenna 12.

Specifically, reflector 22a according to Modification 1, wherein front end portion 22aa of the reflector 22a has a triangular shape having an apex in the +X direction in plan view, and the array direction of the antenna 12 is set to have an angle of 9 degrees or more (θ in FIG. 5A) with respect to the extending direction of front end portion 22aa of reflector 22a in plan view.

Further, front end portion 22aa of reflector 22a of the Modification 2 has an arcuate shape protruding in the direction of the +X direction in plan view.

Therefore, in any of light apparatus U1 according to the Modification 1 and light apparatus U1 according to the Modification 2, the reflected waves arriving at front end portion 22aa of reflector 22a can be reflected in +Y direction or −Y direction in the same manner as light apparatus U1 according to Embodiment 1.

The same effect can also be expected when front end portion 22aa of reflector 22a has a concave shape with respect to +X direction in plan view. For example, the concave shape may be an arc shape or a saw shape, and the end portion may have a meander line shape or have a slit.

Embodiment 2

Next, with reference to FIGS. 6 to 9, a description will be given of a configuration of light apparatus U1 according to Embodiment 2. Light apparatus U1 according to Embodiment 2 differs from Embodiment 1 in having garnish material 40. Note that description of the structure in common with Embodiment 1 is omitted.

Figure 6:
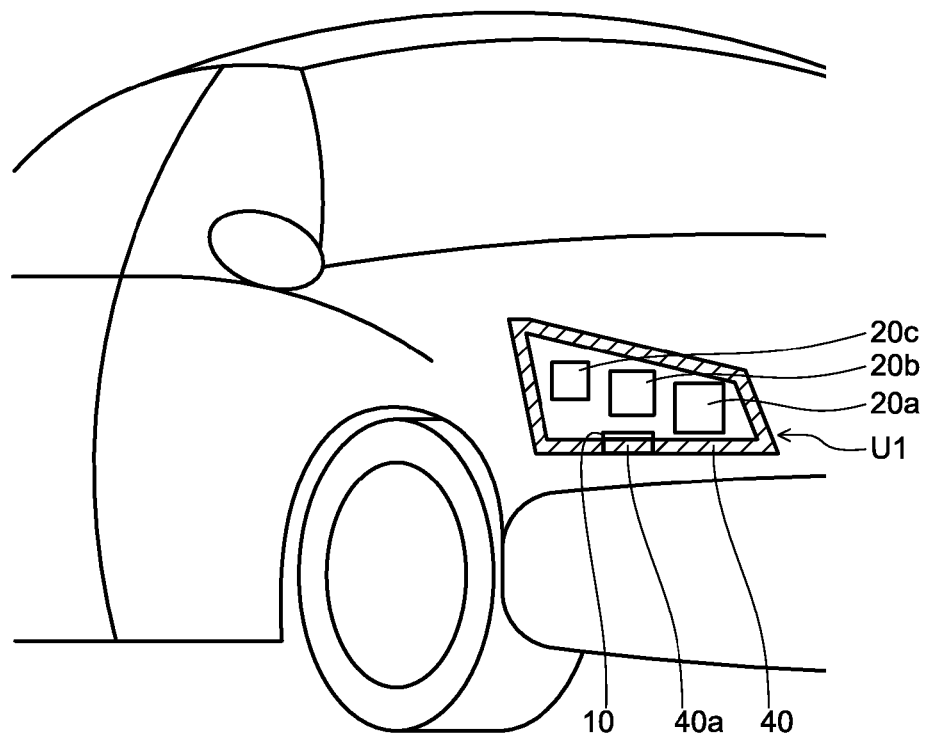
FIG. 6 is a general drawing illustrating an example of a configuration of a light apparatus according to Embodiment 2.
Figure 7:
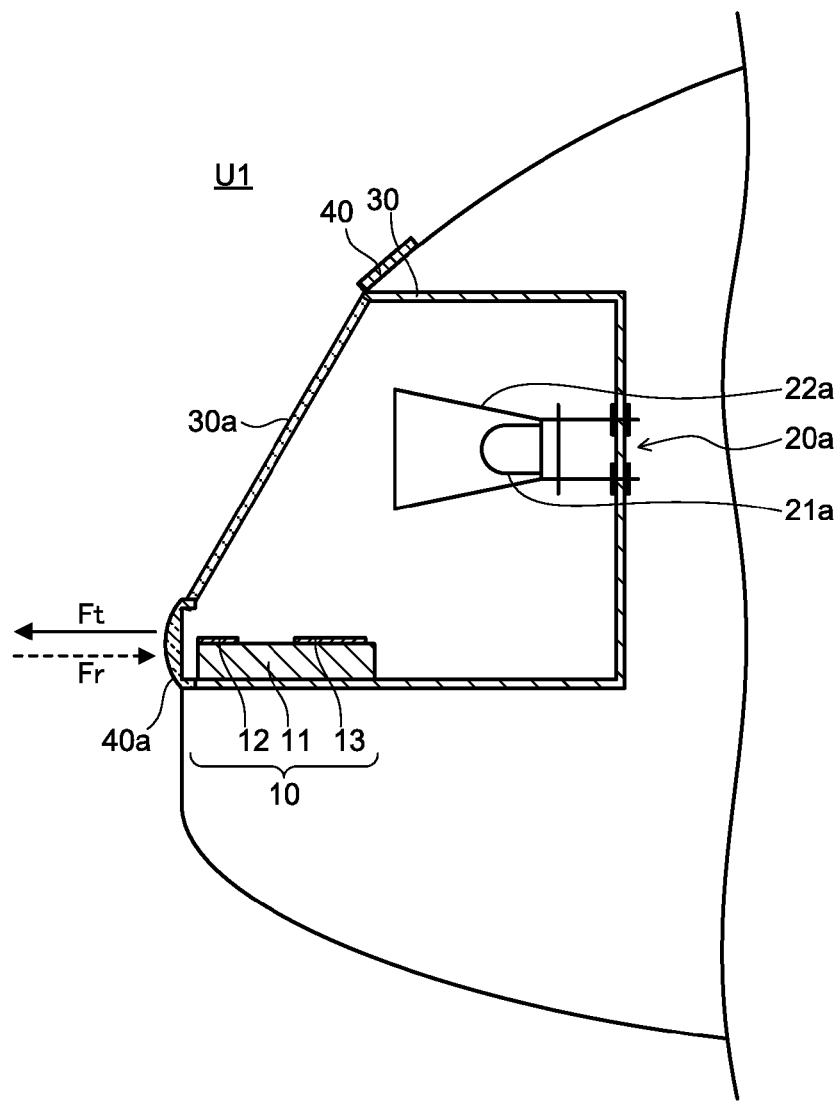
FIG. 7 is a sectional side view illustrating an example of a configuration of the light apparatus according to Embodiment 2.
Figure 8:
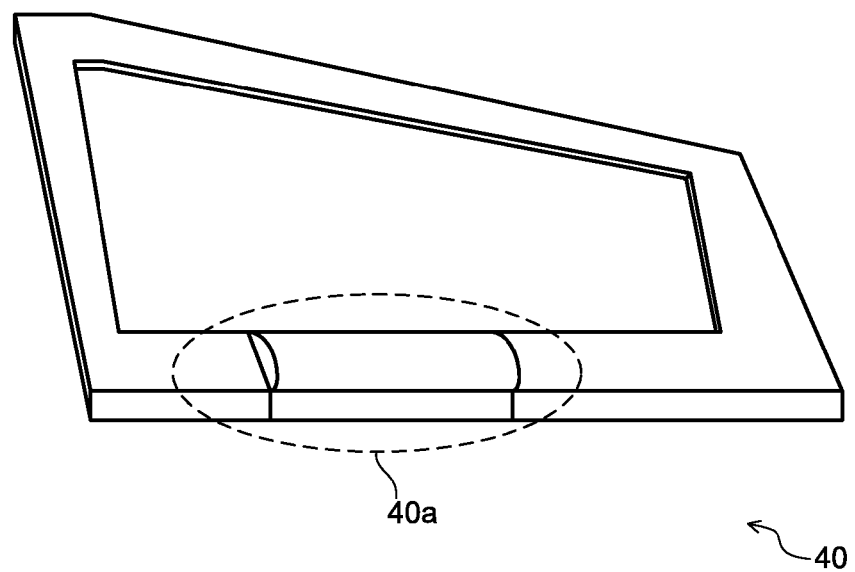
FIG. 8 is a perspective view illustrating an example of a configuration of a garnish material according to Embodiment 2.
Figure 9:
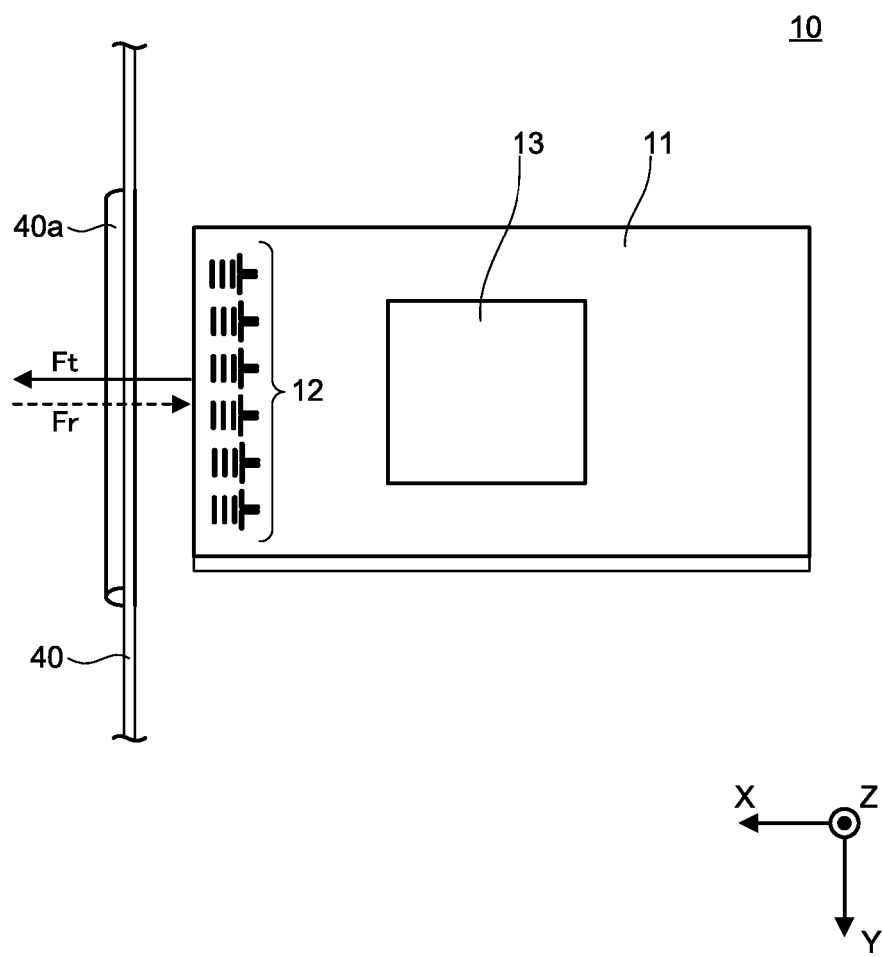
FIG. 9 is a plan view of a radar unit according to Embodiment 2 viewed from above.

FIG. 6 is a general drawing illustrating an example of a configuration of light apparatus U1 according to Embodiment 2. FIG. 7 is a sectional side view illustrating an example of a configuration of light apparatus U1 according to Embodiment 2. FIG. 8 is a perspective view illustrating an example of a configuration of garnish material 40 according to Embodiment 2. FIG. 9 is a plan view of radar unit 10 according to Embodiment 2 viewed from above.

Garnish material 40 is a design member, and is disposed to configure a part of the exterior of the vehicle by surrounding the region where light emitted from light source 21 passes through at the front side of lamp unit 20 and radar unit 10. Garnish material 40 is formed as a substantially rectangular frame member surrounding the outer periphery of front cover 30a, for example, on the front face of the vehicle body (see FIG. 8). The shape of garnish material 40 in FIG. 6 may be a shape that surrounds the entire periphery of front cover 30a, and the garnish material may be a shape that surrounds partially the periphery of front cover 30a.

Garnish material 40 has lens 40a for condensing or diffusing (condensing in this case) the electromagnetic wave in an area through which the electromagnetic waves transmitted and received by antenna 12 passes (that is, a front area of antenna 12). Lens 40a typically narrows a beam of the electromagnetic wave transmitted by antenna 12, and transmits the same forward, and condenses the reflected wave, which is the electromagnetic wave reflected by and returned from the target, on antenna 12.

As the material of garnish material 40, for example, a resin material such as ABS resin or polypropylene resin is used. Garnish material 40 is formed by, for example, resin molding (for example, injection molding), and lens 40a is formed as part of the shape of garnish material 40. Garnish material 40, for example, is different from front cover 30a and is formed of an opaque material.

Lens 40a is formed of a semi-cylindrical or parabolic cylindrical lens, which, for example, protrudes in +X direction and extends in the ±Y direction. Lens 40a of the semi-cylindrical or parabolic cylindrical shape has substantially the same shape in side cross section at any position in ±Y direction, so that a refractive angle of the reflected wave reaching the different positions in the ±Y direction can be made to be the same. As a result, the reflected waves coming from the outside of the apparatus are prevented from entering the antenna 12 from the various directions (for example, +Y direction side -Y direction side with respect to the antenna 12). In other words, it is possible to prevent deterioration in the accuracy of detection of an object (for example, deterioration in accuracy due to mutual interference or deterioration in accuracy due to a change in phase difference).

As described above, according to in-vehicle light apparatus U1 of Embodiment 2, garnish material 40 can function as a cover member for protecting radar unit 10, and a dielectric lens for condensing electromagnetic waves transmitted and received by radar unit 10.

This makes it possible to save space for installation of the in-vehicle light apparatus U1 in a vehicle body while improving the radar performance in radar unit 10, while maintaining the exterior design of the vehicle. This also makes it possible to prevent the deterioration of the radar performance caused by the multiple reflections generated between radar unit 10 and the other components arranged in front of radar unit 10, since radar unit 10 can transmit and receive the electromagnetic waves without any other members (for example, a bumper) other than garnish material 40.

(Modified Modes)

Embodiments of the present invention are not limited to the above-described Embodiments 1 and 2, and various modified modes are conceivable.

In Embodiments 1 and 2, although a headlight is illustrated as an example of a target to be applied to light apparatus U1, light apparatus U1 according to the present disclosure can also be applied to a tail light or a small light.

Further, in Embodiments 1 and 2, antenna 12 of radar unit 10 is disposed in front of reflector 20 as an example of a suitable positional relationship between antenna 12 and reflector 20. However, the embodiments of the present invention are not limited to these modes, and antenna 12 of radar unit 10 may be disposed at a rear position relative to a distal end portion of reflector 20 in plan view. In this case as well, the effect of suppressing the occurrence of multiple waves by arranging the distal end portion of reflector 20 and the antenna array direction of radar unit 10 in a non-parallel relationship can be expected.

Further, in Embodiments 1 and 2, as an example of light apparatus U1, a mode of a horizontal type radar unit 10 using an end-fire array antenna is illustrated. However, light apparatus U1 according to the present disclosure can be applied not only to horizontal type radar unit 10, but also to a vertical type radar unit (that is, a radar unit having a short length in the ±X direction) using a patch antenna or the like having a directional characteristics in the normal direction of the board surface.

In Embodiments 1 and 2, an end fire array antenna is illustrated as an example of an antenna element constituting antenna 12. However, antenna 12 may be constituted by a conductor pattern formed on circuit board 11, and it may be constituted by a Yagi array antenna, a Fermi antenna, a post-wall waveguide antenna, a post-wall horn antenna, or the like, in addition to the end fire array antenna.

Further, in Embodiments 1 and 2, a semi-cylindrical lens is illustrated as an example of the shape of lens 40a of garnish material 40. However, the shape of lens 40a may be a dome-shaped lens, a double-sided convex lens, a ball lens, a Fresnel lens, a combination thereof, or a combination of concave lens and these lenses. Further, as lens 40a, there may be applied a concave lens that diffuses the electromagnetic waves transmitted from antenna 12.

Further, in Embodiments 1 and 2, as an example of light apparatus U1, a mode having three lamp units 20 is illustrated. However, light apparatus U1 according to the embodiment of the present invention may have only one lamp unit 20.

According to an in-vehicle light apparatus according to an example of the present disclosure, it is possible to suppress deterioration of radar performance caused by multiple reflections with an integrated radar and lamp configuration.

Embodiment 3

In the conventional in-vehicle light apparatus, the radar apparatus and the light source of the lamp are disposed close to each other. Therefore, in the in-vehicle light apparatus according to the prior art, there has been a problem that an electronic component such as a microcomputer of a radar apparatus is damaged by radiant heat from the light source, and the operation of the radar apparatus becomes unstable.

In the in-vehicle light apparatus according to the prior art, the electromagnetic wave transmitted from the radar apparatus and returned by being reflected by the target may be re-reflected by the reflector of the lamp (the reflective member which condenses light emitted from the light source and controls the irradiation range of the light) and reach the antenna of the radar apparatus. In particular, since the reflector is a reflective member having a planar spread, it is possible to cause multiple reflections with respect to the circuit board and the like where the antenna is disposed, and to generate a standing wave between the reflector and the antenna. Then, the standing wave is superimposed on the electromagnetic wave that directly arrives at the antenna from the target, and a blind spot area in which the target cannot be detected is generated in the reception characteristics of the antenna.

An example of the present disclosure provides an in-vehicle light apparatus capable of suppressing the propagation of radiant heat and the propagation of electromagnetic waves to a radar apparatus side from the lamp side while the radar apparatus and the lamp are integrally constituted.

In each drawing, in order to clarify the positional relationship in each configuration, a common orthogonal coordinate system (X, Y, Z) is illustrated with reference to a forward direction in which the radar apparatus (corresponding to a radar unit of the present disclosure) transmits the electromagnetic wave to the outside the apparatus (that is, the direction of detection of an object). In the following description, a plus direction of the X-axis represents the forward in which the radar apparatus transmits an electromagnetic wave to the outside the apparatus (hereinafter referred to as "forward" or "first direction"), a plus direction of the Y-axis represents the left side direction of the radar apparatus (hereinafter abbreviated as "left direction") and a plus direction of the Z-axis represents upward of radar apparatus (hereinafter abbreviated as "upward").

In the following description, +Z direction corresponds to the upward of the vehicle, and a direction about 30 degrees in the +Y direction from +X direction corresponds to the direction of travel of the vehicle.

Hereinafter, an example of the configuration of the in-vehicle light apparatus according to Embodiment 3 (hereinafter abbreviated as "light apparatus") will be described. The light apparatus according to Embodiment 3 is applied to a headlight configured to illuminate the front of the vehicle. Note that only the configuration of a headlight on the right front of the vehicle will be described.

Figure 10A:
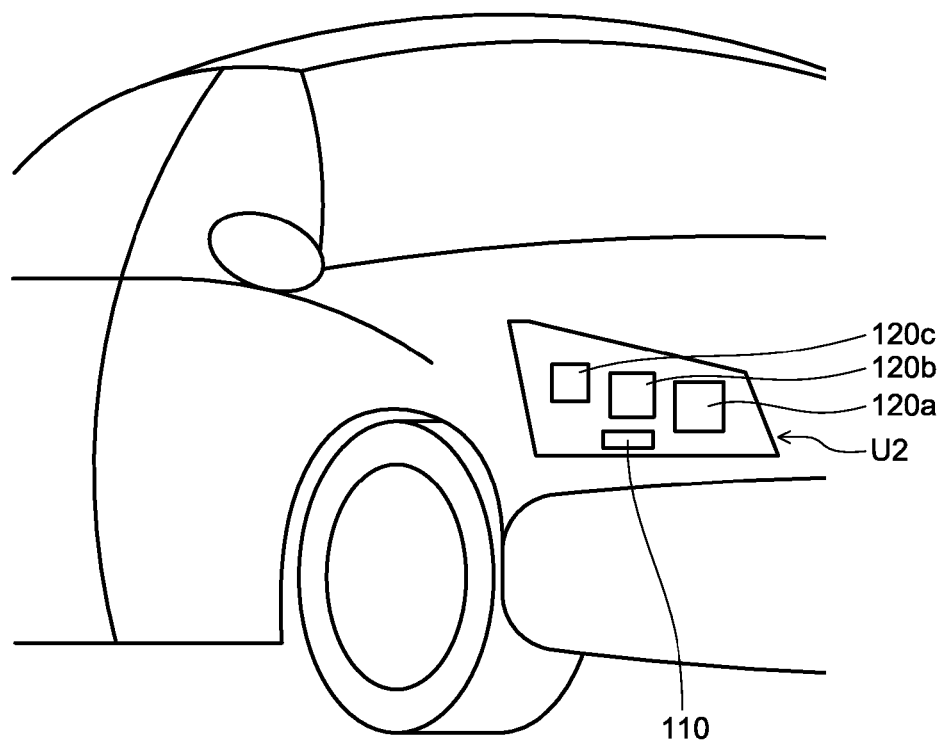
FIG. 10A is a perspective view illustrating a state of installation of a light apparatus in a vehicle according to Embodiment 3.
Figure 10B:
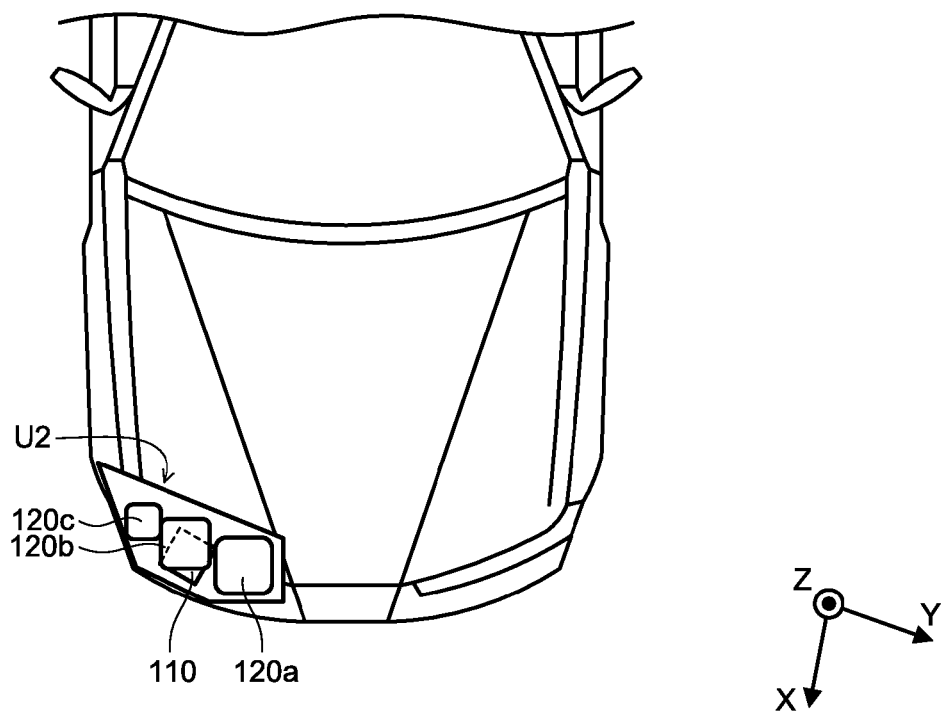
FIG. 10B is a plan view illustrating the state of installation of the light apparatus in the vehicle according to Embodiment 3.
Figure 10C:
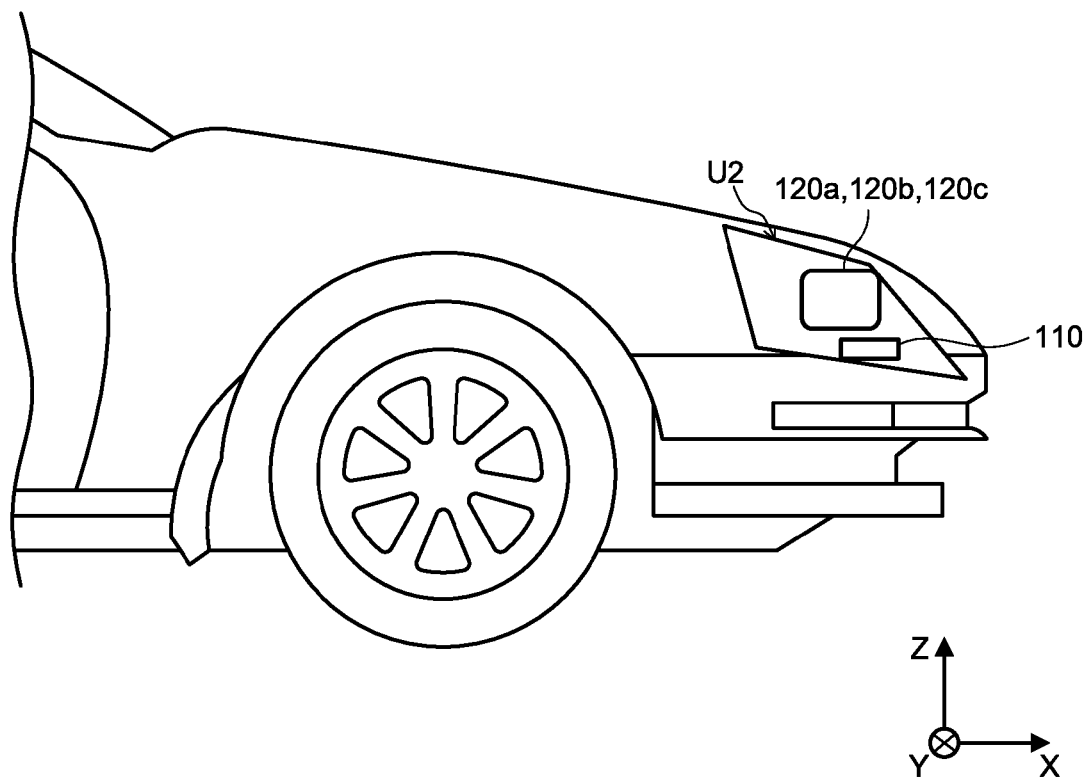
FIG. 10C is a front view illustrating the state of installation of the light apparatus in the vehicle according to Embodiment 3.

FIG. 10A is a perspective view illustrating a state of installation in the vehicle of light apparatus U2 according to Embodiment 3. FIG. 10B is a plan view illustrating a state of installation in the vehicle of light apparatus U2 according to Embodiment 3. FIG. 10C is a front view illustrating a state of installation in the vehicle of light apparatus U2 according to Embodiment 3.

Light apparatus U2 according to Embodiment 3 includes radar unit 110, lamp units 120a, 120b, and 120c.

In light apparatus U2 according to Embodiment 3, three lamp units 120a, 120b, and 120c are arranged adjacent along the left-right direction, and radar unit 110 is disposed on a lower side of lamp units 120a, 120b, and 120c.

Radar unit 110 according to Embodiment 3 transmits an electromagnetic wave obliquely rightward (+X direction) with respect to the direction of travel of the vehicle, and performs detection of an object present in the corresponding direction. Then, a radar unit (not illustrated) built in the left headlight performs detection of an object present obliquely leftward with respect to the direction of travel of the vehicle.

Figure 11:
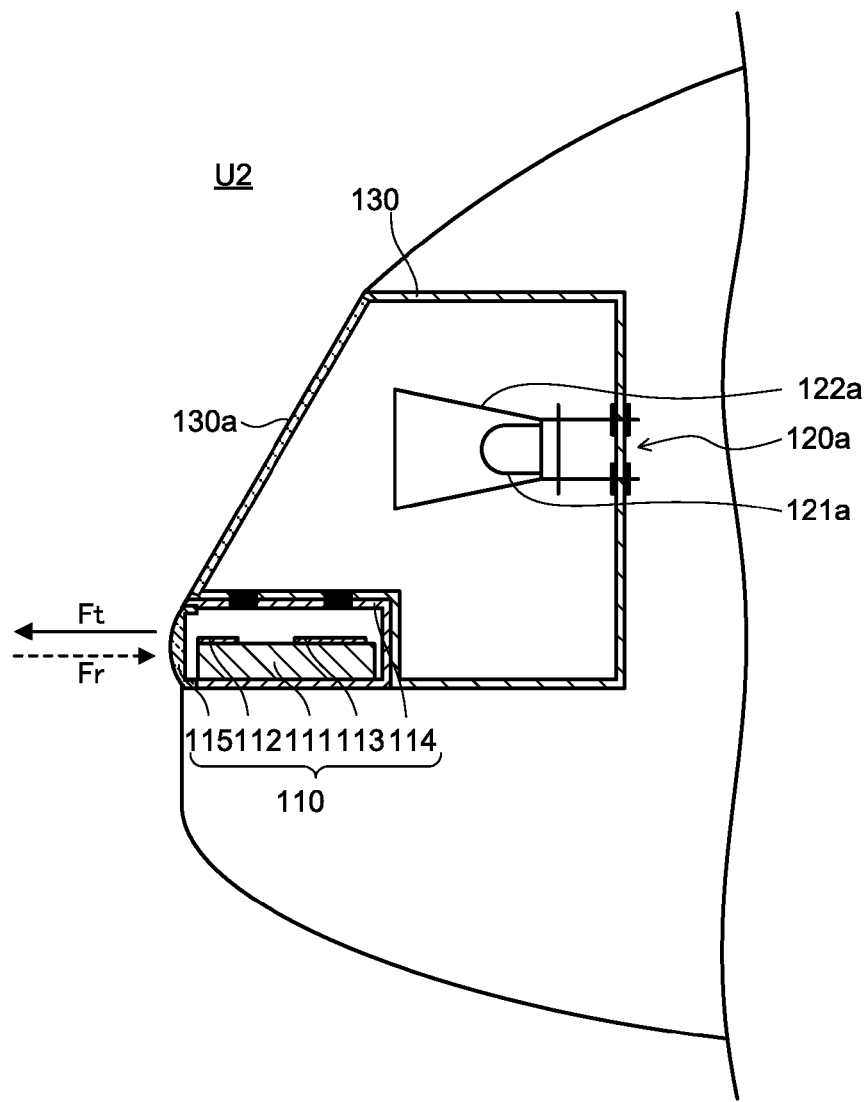
FIG. 11 is a sectional side view illustrating an example of a configuration of the light apparatus according to Embodiment 3.
Figure 12:
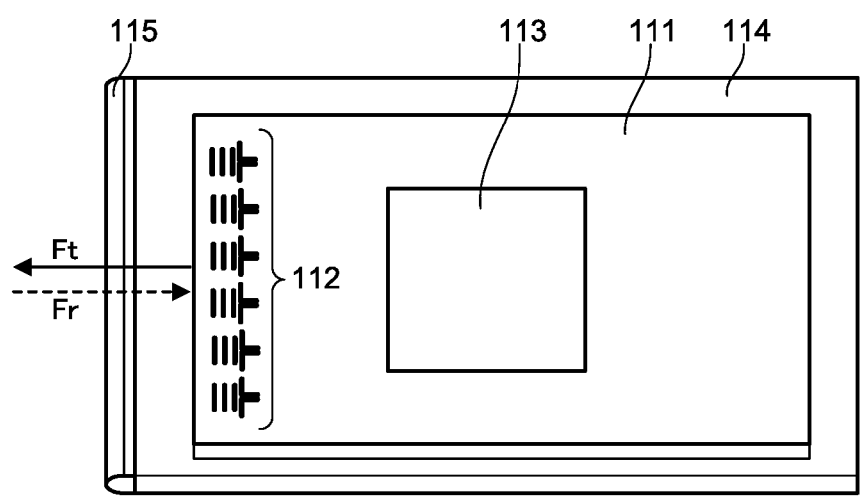
FIG. 12 is a plan view of a radar unit according to Embodiment 3 viewed from above.
Figure 12:
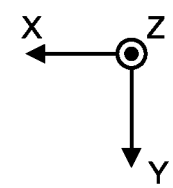
Figure 13:
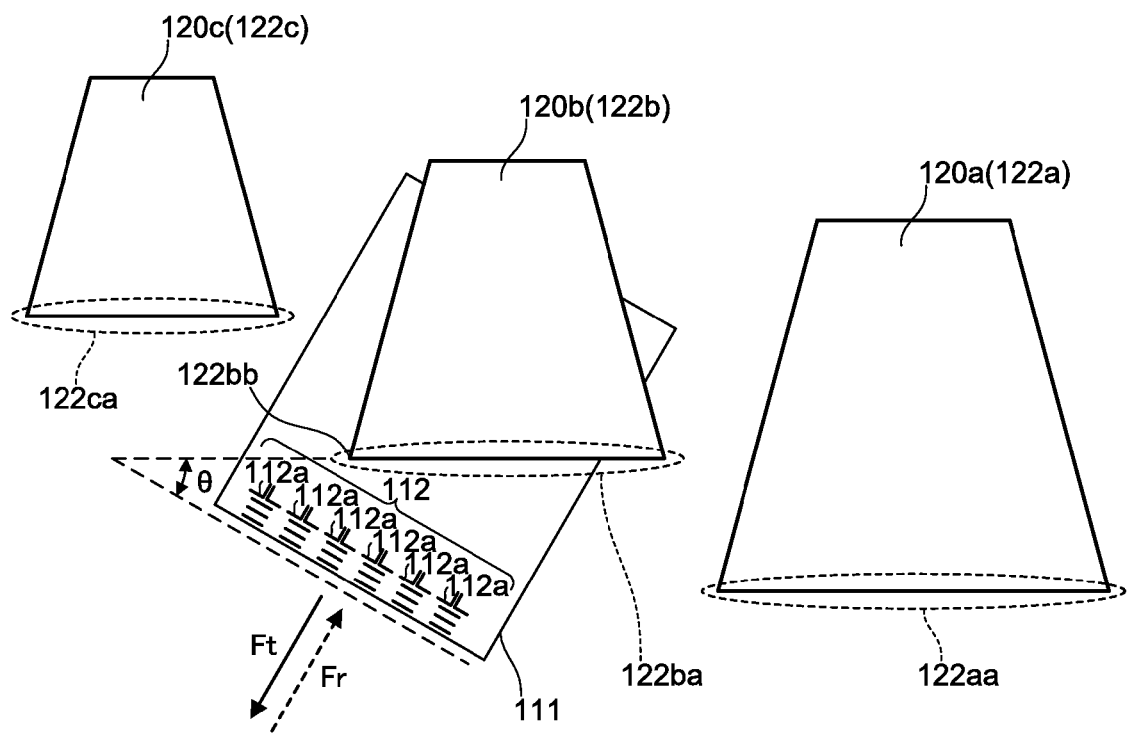
FIG. 13 is a plan view illustrating a positional relationship of a radar unit and a lamp unit of the light apparatus according to Embodiment 3.
Figure 14:
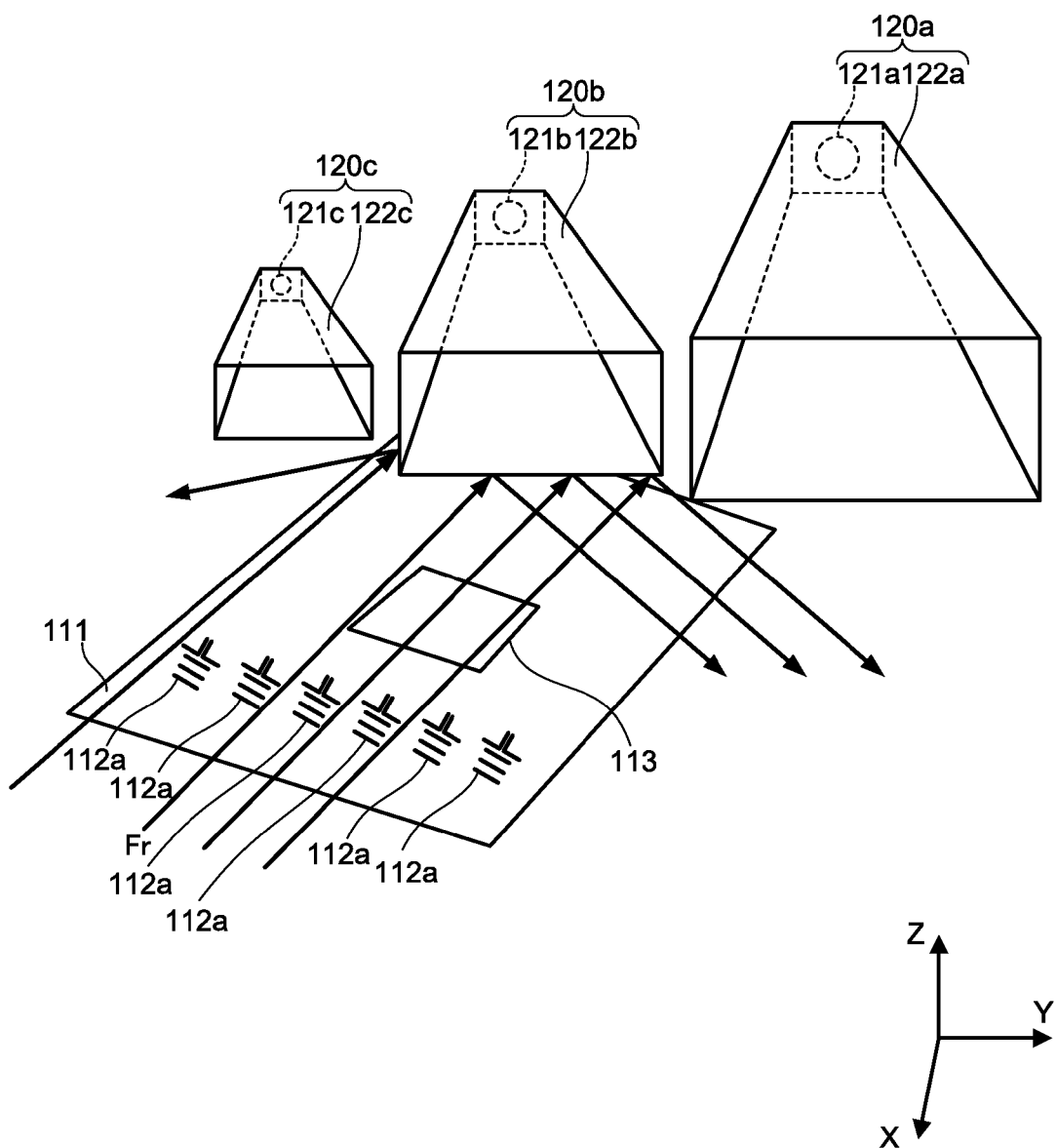
FIG. 14 is an upper perspective view illustrating a positional relationship of a radar unit and a lamp unit of the light apparatus according to Embodiment 3.

FIG. 11 is a sectional side view illustrating an example of a configuration of light apparatus U2 according to Embodiment 3. FIG. 12 is a plan view of radar unit 110 according to Embodiment 3 viewed from above. FIG. 13 is a plan view illustrating a positional relationship between radar unit 110 and lamp units 120a, 120b, and 120c of light apparatus U2 according to Embodiment 3. FIG. 14 is an upper perspective view illustrating the positional relationship between radar unit 110 and lamp units 120a, 120b, and 120c of light apparatus U2 according to Embodiment 3. In FIG. 13 and FIG. 14, illustration of separator 114 is omitted.

Lamp unit 120a includes light source 121a and reflector 122a. Lamp unit 120a is housed in lamp housing 130 together with lamp units 120b and 120c.

Lamp housing 130 forms a storage space in the front end region of the vehicle, and lamp units 120a, 120b, and 120c in the storage space. Lamp housing 130 also has front cover 130a configured to cover the front face of the storage space. Lamp housing 130 is made of, for example, a resin material (for example, polycarbonate and the like). Front cover 130a is made of, for example, a resin material having transparency to light (for example, polycarbonate and the like).

Light source 121a is, for example, an incandescent lamp, and emits light toward the front (in this case, a direction about 30 degrees to the −Y side from +X direction). Light source 121a is attached to a rear side wall of lamp housing 130. Note that a light source having a condensing lens may be used as light source 121a.

Reflector 122a is disposed so as to surround the periphery of light source 121a, collects light emitted from light source 121a, and adjusts an irradiation range of light. Reflector 122a is formed of, for example, a quadrangular pyramid-shaped cylindrical member having an opening directed toward the front side and increasing in opening diameter toward the front side. Reflector 122a is formed of a metal member such as an aluminum material, for example. Reflector 122a may be formed by metallizing a resin member.

Lamp units 120b and 120c have the same configuration as lamp unit 120a, and are made up of light sources 121b and 121c and reflectors 122b and 122c surrounding light sources 121b and 121c, respectively. Lamp units 120a, 120b, and 120c are equipped with a system that automatically shifts the headlight irradiation area, for example, called an adaptive high beam system.

Hereinafter, any one of lamp unit 120a, lamp unit 120b, and lamp unit 120c is abbreviated as "lamp unit 120", "light source 121", and "reflector 122" unless particularly distinguished.

Radar unit 110 includes circuit board 111, antenna 112, signal processing IC 113, separator 114, and dielectric lens 115.

Circuit board 111 is a board on which antenna 112 and signal processing IC 113 are mounted. As circuit board 111, for example, a Printed Circuit Board (PCB), a semiconductor substrate with built-in signal processing IC 113, or the like is used.

From the viewpoint of miniaturization of light apparatus U2, circuit board 111 is disposed on the lower side of reflector 122 so that the board surface extends substantially along the horizontal direction. Here, "substantially along the horizontal direction" includes not only a state in which the board surface is completely horizontal to the ground but also a state in which the board surface is inclined with respect to the ground. Circuit board 111 may be disposed on the upper side of reflector 122.

In other words, radar unit 110 constitutes a horizontal type millimeter wave radar in which circuit board 111 is disposed horizontally. As a result, radar unit 110 is thinner than lamp unit 120 in the ±Z directions.

Antenna 112 is disposed in the front area of the board surface of circuit board 111 and transmits electromagnetic wave Ft forward (+X direction), and receives reflected wave Fr which is the electromagnetic wave reflected by a target.

Antenna 112 is, for example, an end-fire array antenna having directional characteristics in the direction of the front end side of circuit board 111. The end-fire array antenna is configured to include a plurality of strip conductors which are arranged such that the longitudinal direction thereof are in parallel, and transmits and receives electromagnetic waves along the direction in which the plurality of strip conductors are arranged. Antenna 112 is composed of, for example, six end-fire array antennas (hereinafter also referred to as "antenna elements") arranged adjacent along ±Y direction. Antenna 112 is formed as a phased array antenna by six antenna elements.

Antenna 112 is disposed on the front side (that is, on the outside side of the vehicle) relative to reflector 122. In other words, antenna 112 is arranged so as not to overlap with reflector 122 in plan view. This prevents antenna 112 and reflector 122 from facing each other, thereby preventing the generation of the standing wave between antenna 112 and reflector 122.

A plurality of the antenna elements constituting antenna 112 are arranged such that the array directions of the plurality of the antenna elements is non-parallel to the extending direction of front end portions 122aa, 122ba, and 122ca of reflector 122 in plan view (see FIGS. 13 and 14). More preferably, the array direction of antenna 112 is set to have an angle ranging from 9 degrees to 171 degrees (angle θ in FIG. 13) with respect to the extending direction of front end portions 122aa, 122ba, and 122ca of reflector 122 in plan view. This makes the reflected waves arriving at front end portions 122aa, 122ba, and 122ca of reflector 122 are diffused away from a position of installation of antenna 112 (in +Y direction or −Y direction here) when re-reflecting at front end portions 122aa, 122ba and 122ca of reflector 122. In other words, it is possible to suppress the amount of the multiple reflected components of the reflected waves arriving at antenna 112.

For example, signal processing IC 113 sends a high-frequency drive signal to antenna 112 to transmit an electromagnetic wave Ft (for example, an electromagnetic wave in the millimeter wave band) from antenna 112, or performs reception processing for a received signal relating to a reflected wave received by antenna 112. Then, reception processing (for example, detection wave processing or frequency analysis processing) by signal processing IC 113 is performed to detect the distance to the target (for example, a vehicle or a person), the azimuth where the target is present, and other parameters such as the reflection intensity and speed of the target. Here, since the reception processing by signal processing IC 113 is the same as that of a known configuration, detailed description thereof is omitted here.

Separator 114 is disposed to partition the space between lamp unit 120 and radar unit 110 to shield the transmission of radiant heat and electromagnetic waves between lamp unit 120 and radar unit 110. Separator 114 according to Embodiment 3 is disposed so as to surround the periphery of circuit board 111, and also functions as a radar housing (hereinafter also referred to as radar housing 114) for accommodating circuit board 111. Separator 114 is mounted on the lower surface of lamp housing 130 by using a fixing member (for example, a screw) in a state in which circuit board 111 is housed.

In particular, separator 114 suppresses the radiant heat emitted from light source 121 from propagating to circuit board 111 (for example, signal processing IC 113) and suppresses the propagation of the electromagnetic waves coming from the front and reflected by reflector 122 to antenna 112. The radiant heat transmitted to separator 114, for example, diffuses to the whole of separator 114, and is dissipated to the member and the outer space that come into contact with separator 114. Accordingly, radiant heat emitted from light source 121 suppresses overheating of signal processing IC 113 mounted on circuit board 111.

Further, separator 114 suppresses the propagation of reflected waves reflected by the target to antenna 112 when re-reflected by reflector 122. Separator 114 also functions to shield the side lobe component of the electromagnetic wave emitted from antenna 112 from being directed toward light source 121 (for example, the control circuit (not illustrated) that controls light source 121).

Any material may be used for separator 114 as long as it is a member capable of shielding the transmission of radiant heat and electromagnetic waves, but typically, a metal member (for example, aluminum or copper) is used. In view of facilitating thermal diffusion, the material of separator 114 is preferably a material having a higher thermal conductivity than the material of lamp housing 130 (for example, a resin material), and a metal member such as aluminum is more preferable. On the other hand, separator 114 may be constituted by a combination of a material having a high thermal conductivity (for example, a carbon containing member) and a member capable of shielding the transmission of electromagnetic waves.

Dielectric lens 115 is mounted on the window portion formed on the front face of radar housing 114 (separator 114), narrows the beam of electromagnetic wave Ft transmitted by antenna 112, transmits the same forward, and condenses the reflected wave returned from the target to antenna 112.

Dielectric lens 115 is, for example, formed of a semi-cylindrical or parabolic cylindrical lens, which protrudes in +X direction and extends in the ±Y direction. Dielectric lens 115 of the semi-cylindrical shape or the parabolic cylinder shape has substantially the same shape in cross section at any position in ±Y direction, so that a refractive angle of the reflected wave reaching the different positions in the ±Y direction can preferably be made to be the same. As a result, the reflected waves coming from the outside of the apparatus are prevented from entering antenna 112 from the various directions (for example, +Y direction side −Y direction side with respect to antenna 112). In other words, it is possible to prevent deterioration in the accuracy of detection of an object (for example, deterioration in accuracy due to mutual interference or deterioration in accuracy due to a change in phase difference).

(Advantageous Effect of One Example)

As described above, in-vehicle light apparatus U2 of Embodiment 3 includes: lamp unit 120 including light source 121 configured to emit light in a first direction, (forward in this case) and reflector 122 surrounding light source 121; radar unit 110 having circuit board 111 disposed such that the board surface extends in a horizontally manner on a lower side or an upper side of lamp unit 120, and antenna 112 disposed on the first direction side relative to reflector 122 in the board surface of circuit board 111 to transmit electromagnetic waves in the first direction and to receive the reflected waves thereof; and separator 114 is disposed so as to partition a space between lamp unit 120 and radar unit 110 to shield the transmission of radiant heat and electromagnetic waves between lamp unit 120 and radar unit 110.

Therefore, according to in-vehicle light apparatus U2 of Embodiment 3, transmission of the radiant heat from light source 121 of lamp unit 120 to radar unit 110 by separator 114 may be suppressed. Accordingly, the occurrence of the operation failure of radar unit 110 due to the influence of heat may be suppressed.

According to in-vehicle light apparatus U2 of Embodiment 3, the spread of the electromagnetic wave (multiple reflected components of the reflected wave) re-reflected by reflector 122 by separator 114 out of the reflected wave from the target to antenna 112 may be suppressed. This makes it possible to suppress the situation in which the multiple reflected components of the reflected waves are superimposed on the reflected waves coming directly from the target to antenna 112, thereby deteriorating the reception characteristics of antenna 112.

Embodiment 4

Next, with reference to FIG. 15, a description will be given of a configuration of light apparatus U2 according to Embodiment 4. Light apparatus U2 according to Embodiment 4 differs from Embodiment 3 in a configuration of separator 114. Note that description of the structure in common with Embodiment 3 is omitted. (hereinafter, the same applies to the other embodiments).

Figure 15:
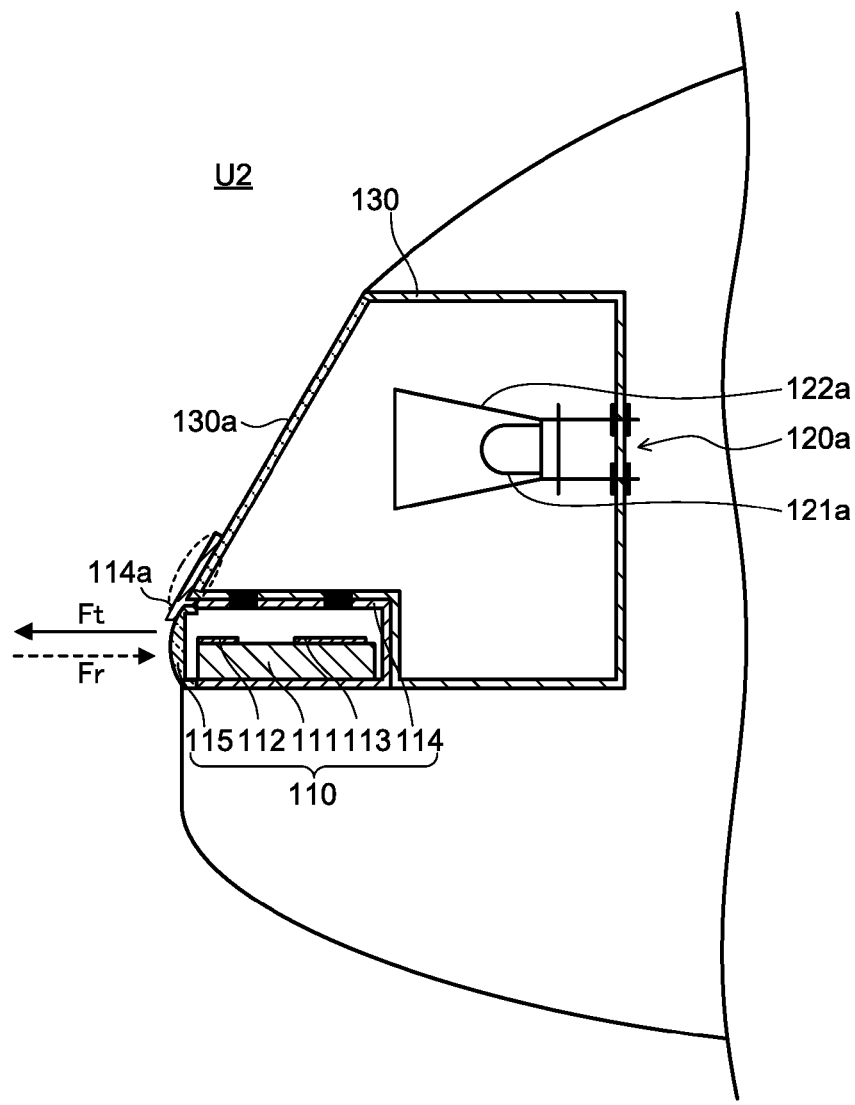
FIG. 15 is a sectional side view illustrating an example of a configuration of the light apparatus according to Embodiment 4.
Figure 15:
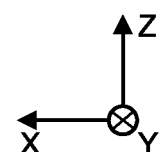

FIG. 15 is a sectional side view illustrating an example of a configuration of light apparatus U2 according to Embodiment 4.

Separator 114 according to Embodiment 4 has first extending portion 114a extending to the front side relative to circuit board 111, and has a configuration of contacting dielectric lens 115 (that is, the cover member) and front cover 130a at first extending portion 114a. More specifically, first extending portion 114a extends to a position coming into contact with the front end face of dielectric lens 115 and the front end face of front cover 130a.

Separator 114 according to Embodiment 4 absorbs radiant heat emitted from light source 121, and the heat is transferred to the front end face of dielectric lens 115 and the front end face of front cover 130a through first extending portion 114a and the front end face of front cover 130a to raise the temperature of the front end face of dielectric lens 115 and of the front end face of front cover 130a. In other words, in Embodiment 4, the heat of separator 114 is utilized for defrosting, defogging or preventing snow accretion of the front end face of dielectric lens 115 and the front end face of front cover 130a.

Here, although first extending portion 114a of separator 114 is in contact with both the front end surface of dielectric lens 115 and the front end face of front cover 130a, it may be configured to come into contact with at least the front end surface of dielectric lens 115. On the other hand, first extending portion 114a is preferable even if other cover members are used instead of dielectric lens in the front of antenna 112.

As described above, according to light apparatus U2 of Embodiment 4, it is possible to raise the temperature of dielectric lens 115 exposed outside the vehicle by using the radiant heat emitted by light source 121. This may suppress attachment of dielectric lens 115 to be prevented from adhering to the ice, snow or the like. This makes it possible to improve the output gain and the reception gain in antenna 112.

Embodiment 5

Next, with reference to FIG. 16, a description will be given of light apparatus U2 according to Embodiment 5. Light apparatus U2 according to Embodiment 5 differs from Embodiment 3 in a configuration of separator 114.

Figure 16:
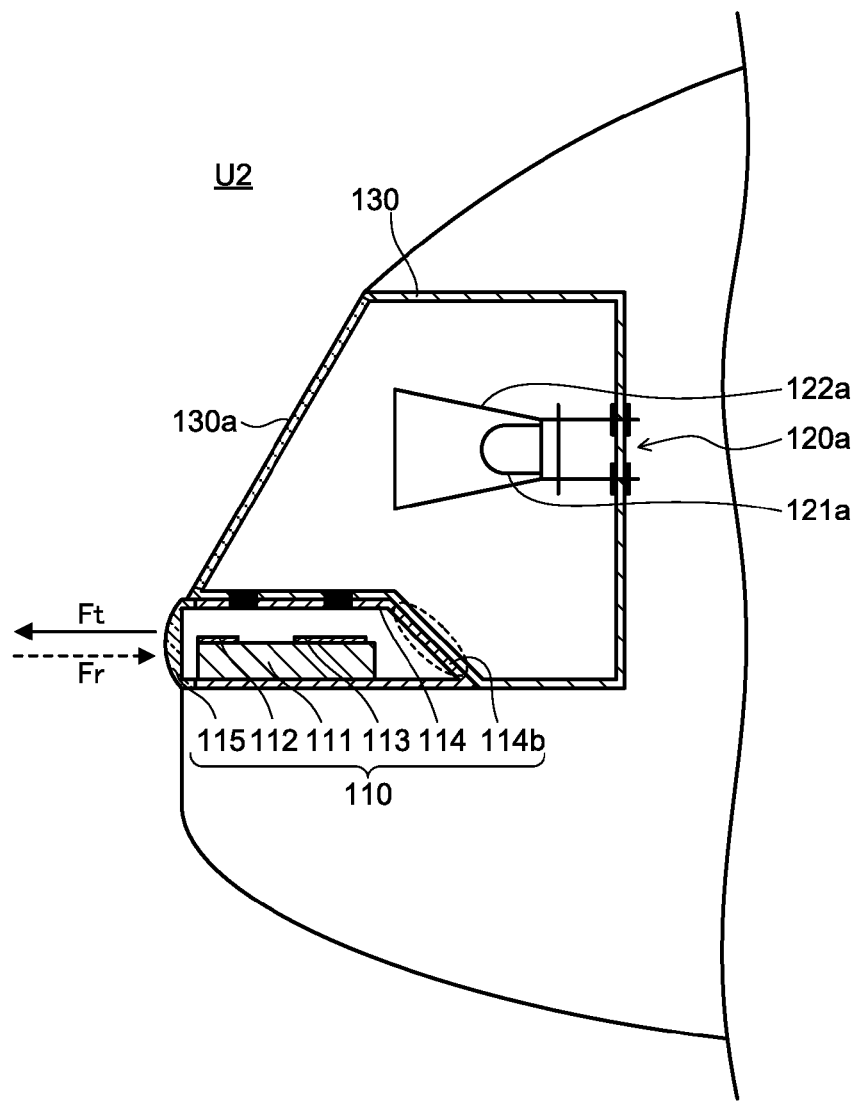
FIG. 16 is a sectional side view illustrating an example of a configuration of the light apparatus according to Embodiment 5.

FIG. 16 is a sectional side view illustrating an example of a configuration of light apparatus U2 according to Embodiment 5.

Separator 114 according to Embodiment 5 has second extending portion 114b extending from a region above circuit board 111 to the rear side of circuit board 111. Further, second extending portion 114b has a structure extending toward the lower side with respect to the horizontal direction. With such a configuration, second extending portion 114b re-reflects the components of the reflected wave from the target directed rearward of circuit board 111 so as to be warped downward to suppress the reflected wave from proceeding from the back side toward antenna 112 again. This makes it possible to suppress the detection of the reflected wave from the rear of circuit board 111 in antenna 112.

In the case where circuit board 111 is disposed above reflector 122, second extending portion 114b has a structure extending toward the upper side with respect to the horizontal direction.

As described above, according to light apparatus U2 of Embodiment 5, the electromagnetic waves reaching antenna 112 due to multiple reflections may be suppressed to improve the reception characteristics in antenna 112.

Embodiment 6

Next, light apparatus U2 according to Embodiment 6 will be described with reference to FIG. 17. Light apparatus U2 according to Embodiment 6 differs from Embodiment 3 in terms of the structure of Separator 14.

Figure 17:
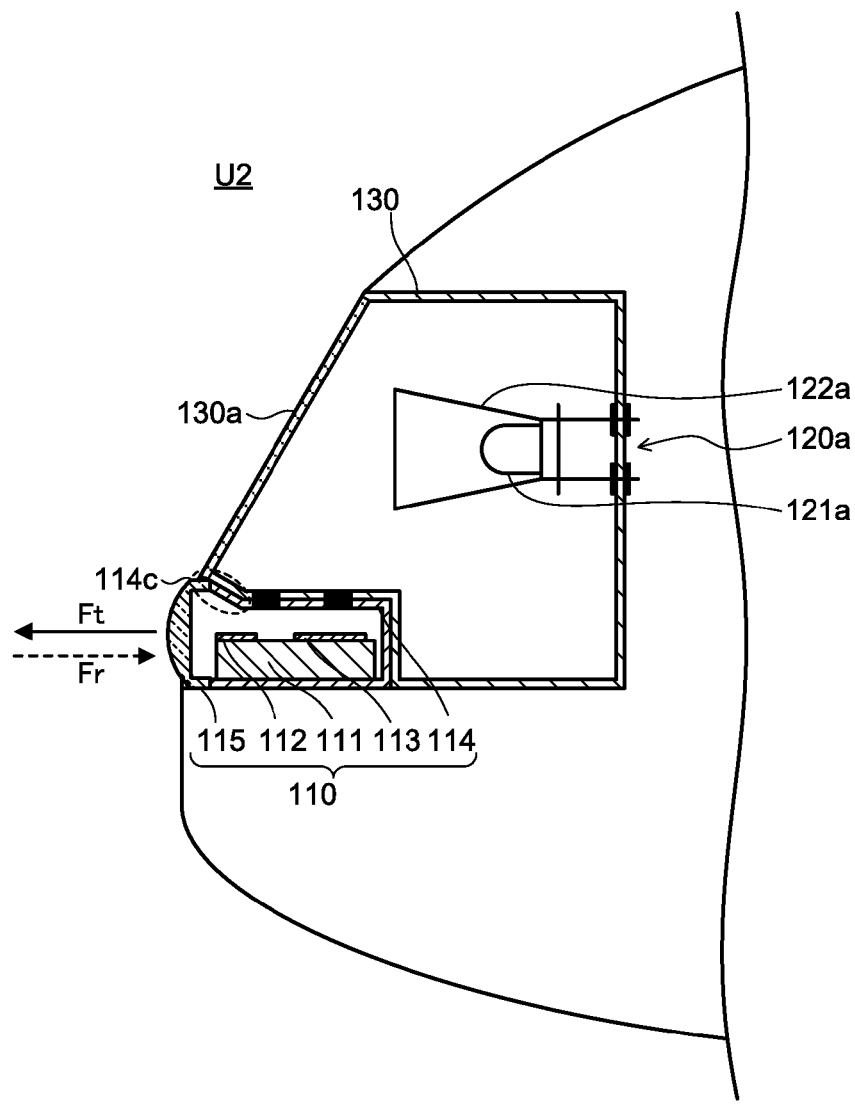
FIG. 17 is a sectional side view illustrating an example of a configuration of the light apparatus according to Embodiment 6.

FIG. 17 is a sectional side view illustrating an example of the configuration of light apparatus U2 according to Embodiment 6.

Separator 114 according to Embodiment 6 has third extending portion 114c extending away from antenna 112 as it goes forward on the front side of circuit board 111. Third extending portion 114c has a shape inclined upward as it goes forward. That is, the shape of separator 114 according to Embodiment 6 is set so that the opening diameter of the window portion for transmitting and receiving an electromagnetic wave is increased as it goes toward the front side of antenna 112.

This makes it possible to suppress a decrease in the output gain of antenna 112 due to reflection of components of an electromagnetic wave transmitted from antenna 112 spreading in the radial direction by separator 114 when antenna 112 transmits the electromagnetic wave, while reducing the size of separator 114 (that is, the radar housing).

As described above, according to light apparatus U2 of Embodiment 6, a decrease in the output gain of antenna 112 caused by the reflection of the electromagnetic wave in separator 114 can be suppressed while reducing the size of the entire apparatus.

Embodiment 7

Next, a light apparatus U2 according to Embodiment 7 will be described with reference to FIG. 18. Light apparatus U2 according to Embodiment 7 differs from Embodiment 3 in that separator 114 has electromagnetic wave absorbing material 114d.

Figure 18:
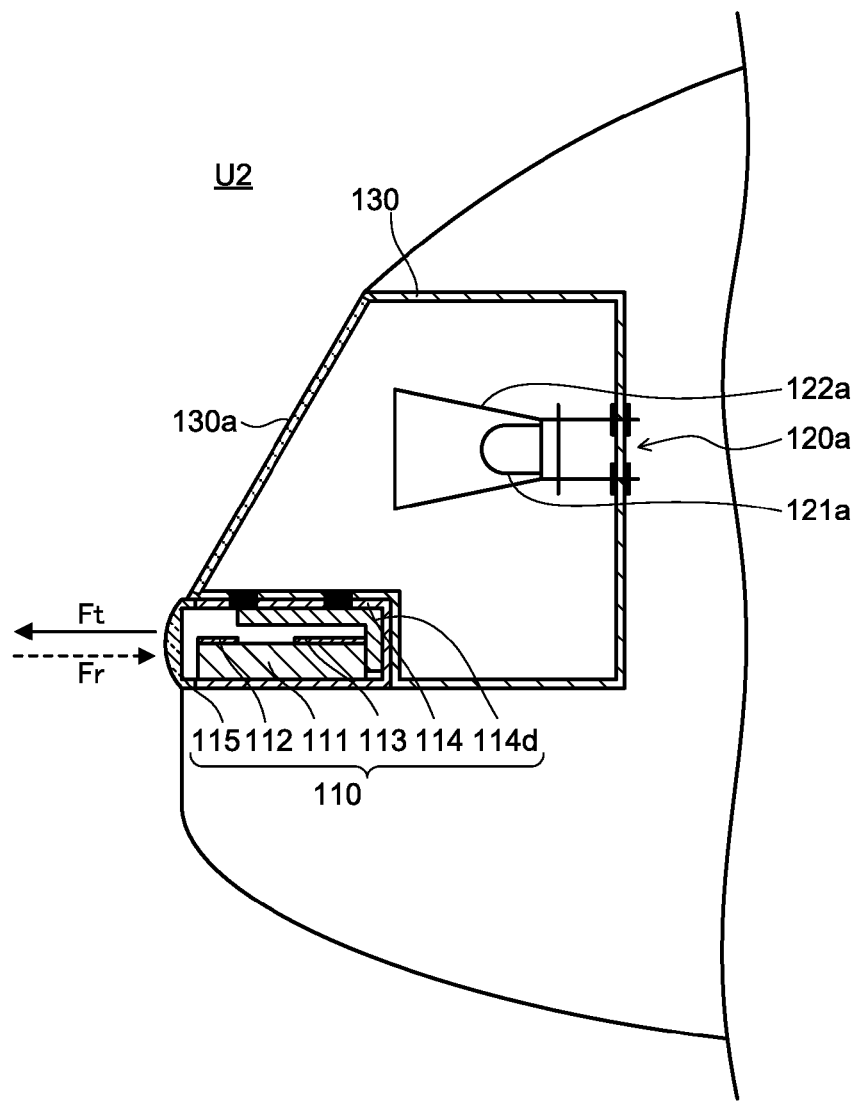
FIG. 18 is a sectional side view illustrating an example of a configuration of the light apparatus according to Embodiment 7.
Figure 18:
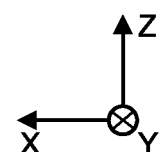

FIG. 18 is a sectional side view illustrating an example of a configuration of light apparatus U2 according to Embodiment 7.

Separator 114 according to Embodiment 7 has an electromagnetic wave absorbing material 114d arranged between circuit board 111 and the inner wall surface of radar housing 114. Electromagnetic wave absorbing material 114d absorbs the components which are directed toward the rear side of antenna 112 of the reflected wave from the target, and suppresses the occurrence of multiple reflections of the reflected wave between separator 114 and circuit board 111.

Examples of the material of the electromagnetic wave absorbing material 114d include a conductive absorbing material configured to absorb a current generated by the electromagnetic wave due to a resistance loss in the interior of the material, a dielectric wave absorbing material (for example, carbon) configured to use a dielectric loss caused by a polarizing response of molecules, a magnetic wave absorbing material (for example, iron, nickel, ferrite) and the like configured to absorb a radio wave due to a magnetic loss of the magnetic material.

Further, examples of the material of the electromagnetic wave absorbing material 114d may also include a material having high heat conductivity, for example, a graphite sheet or the like may be used.

As described above, according to light apparatus U2 of Embodiment 7, the electromagnetic waves reaching antenna 112 due to multiple reflections may be suppressed to improve the reception characteristics in antenna 112.

(Modified Modes)

Embodiments of the present invention are not limited to the above-described Embodiments 3 to 7, but various modified modes are also conceivable.

In Embodiments 3 to 7, various modes of an example of the configuration of light apparatus U2 are illustrated. However, it is needless to say that a combination of modes described in the respective embodiments may also be used.

Further, in the above third to Embodiments 3 to 7, the headlight is illustrated as an example of the target to be applied of light apparatus U2, but light apparatus U2 according to the present disclosure can be applied to a tail light or a small light.

Further, in Embodiments 3 to 7, as an example of light apparatus U2, a mode of horizontal type radar unit 110 using an end-fire array antenna is illustrated. However, light apparatus U2 according to the present disclosure can be applied not only to horizontal type radar unit 110 but also to a vertical type radar unit using a patch antenna or the like having directional characteristics in the normal direction of the board surface.

Further, in Embodiments 3 to 7 described above, as an example of the position of installation of circuit board 111, a case of the lower side of reflector 122 is illustrated. However, as the position of installation of circuit board 111, the upper side of reflector 122 is also applicable. Note that in this case, the position of installation of separator 114 is on the lower surface side of circuit board 111.

In Embodiments 3 to 7, an end-fire array antenna is illustrated as an example of an antenna element constituting antenna 112. However, antenna 112 only needs to be made up of a conductor pattern formed on circuit board 111, and instead of the end-fire array antenna, a Yagi array antenna, a Fermi antenna, a post wall waveguide antenna, or a post wall horn antenna or the like are also applicable.

In Embodiments 3 to 7, a semi-cylindrical lens is illustrated as an example of the shape of dielectric lens 115. However, examples of the shape of dielectric lens 115 include a dome-shaped lens, a double-sided convex lens, a ball lens, a Fresnel lens, or a combination thereof, or a concave lens and a combination thereof. In addition, as dielectric lens 115, a concave lens that diffuses an electromagnetic wave transmitted from antenna 112 may be applied.

In Embodiments 3 to 7 described above, a mode in which three lamp units 120 are provided as an example of light apparatus U2 is described. However, in-vehicle light apparatus U2 according to the embodiments of the present invention may have a configuration having only one lamp unit 120.

According to the in-vehicle light apparatus of an example of the present disclosure, propagation of radiant heat and electromagnetic wave from the lamp side to the radar apparatus side can be suppressed.

The in-vehicle light apparatus according to an example of the present disclosure is an in-vehicle light apparatus for monitoring a region in a first direction outside a vehicle, including: a lamp unit including a light source that emits light in the first direction, and a reflector surrounding the light source; a radar unit including a circuit board disposed such that a board surface extends substantially along the horizontal direction on a lower side or an upper side of the lamp unit and an antenna disposed on the first direction side relative to the reflector in the board surface of circuit board to transmit electromagnetic waves in the first direction and to receive the reflected waves thereof; and a separator disposed so as to partition a space between the lamp unit and the radar unit to shield the transmission of radiant heat and electromagnetic waves between the lamp unit and the radar unit.

In an in-vehicle light apparatus according to an example of the present disclosure, the separator is made of a material having higher thermal conductivity than a lamp housing that houses the lamp unit.

In the in-vehicle light apparatus according to an example of the present disclosure, the separator is constituted by a metal member.

In an in-vehicle light apparatus according to an example of the present disclosure, the separator has a first extending portion extending to the first direction side relative to the circuit board, and the first extending portion contacts with a cover member disposed to cover the area where the electromagnetic waves pass through.

In an in-vehicle light apparatus according to an example of the present disclosure, the separator includes a second extending portion that extends from the first extending portion to the rear side of the circuit board, the rear side being opposite to the first direction, and the second extending portion reflects the electromagnetic waves reaching from the first direction side to the rear side of the circuit board to the lower side or the upper side.

In the in-vehicle light apparatus according to an example of the present disclosure, the separator includes a third extending portion that extends away from the antenna as it goes toward the first direction on the first direction side of the circuit board.

In an in-vehicle light apparatus according to an example of the present disclosure, the separator includes a member having electromagnetic wave absorption characteristics.

In the in-vehicle light apparatus according to an example of the present disclosure, the antenna is made up of an end-fire array antenna.

Embodiment 8

Incidentally, in the in-vehicle light apparatus of this type, the radar apparatus is disposed in a state of being covered with the cover member in order to protect the built-in radar apparatus. The radar apparatus transmits and receives electromagnetic waves to and from the area outside the vehicle via the cover member.

However, depending on a driving environment of the vehicle, there are cases where ice, snow, and frost adheres to the cover member. In such a case, due to the ice, snow or the like adhering to the cover member, there is a problem that the output gain and reception gain of the electromagnetic wave transmitted and received by the radar apparatus are lowered, and the detection accuracy of the detection of an object of the radar apparatus is lowered.

In view of such problems described above, one example of the present disclosure provides a control apparatus of an in-vehicle light apparatus capable of suppressing decrease in radar performance caused by ice, snow or the like adhering to the cover member disposed in front of the radar apparatus.

[Configuration of In-Vehicle Light Apparatus]

Hereinafter, an example of the configuration of an in-vehicle light apparatus (hereinafter abbreviated as "light apparatus") according to Embodiment 8 will be described. The light apparatus according to Embodiment 1 is applied to a headlight configured to illuminate the front of the vehicle. Note that only the configuration of a headlight on the right front of the vehicle will be described.

In each drawing, in order to clarify the positional relationship of each component, a common orthogonal coordinate system based on the forward direction (that is, the direction subject to detection of an object) in which radar apparatus transmits an electromagnetic wave to the outside apparatus (X, Y, Z). In the following description, the plus direction on the X-axis represents the front direction (hereinafter abbreviated as "forward direction" or "first direction") in which the radar apparatus transmits an electromagnetic wave to the outside the apparatus, and the plus direction on the Y-axis represents the right direction of a side of the radar apparatus (hereinafter abbreviated as "rightward direction"), and the plus direction of the Z-axis represents the upward of the radar apparatus (hereinafter abbreviated as "upward direction").

In the following description, +Z direction is corresponds to the upward direction of the vehicle, and the direction about 30 degrees to the minus Y direction from the +x direction corresponds to the direction of travel of the vehicle.

Figure 19:
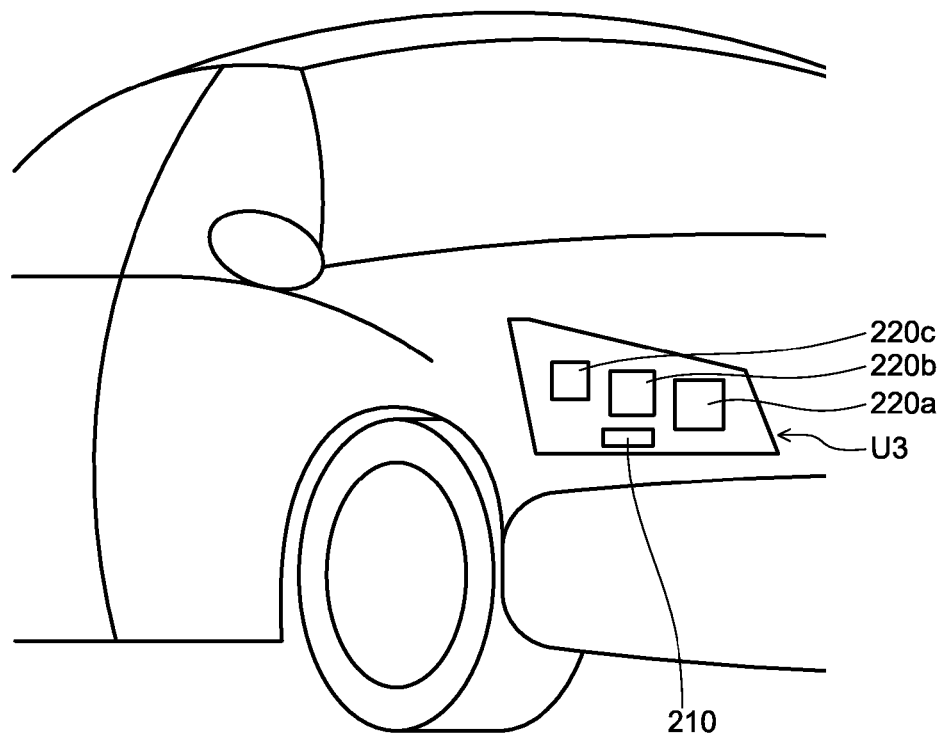
FIG. 19 is a perspective view illustrating a state of installation of an in-vehicle light apparatus in a vehicle according to Embodiment 8.

FIG. 19 is a perspective view illustrating a state of installation in the vehicle of light apparatus U3 according to Embodiment 8.

Figure 20:
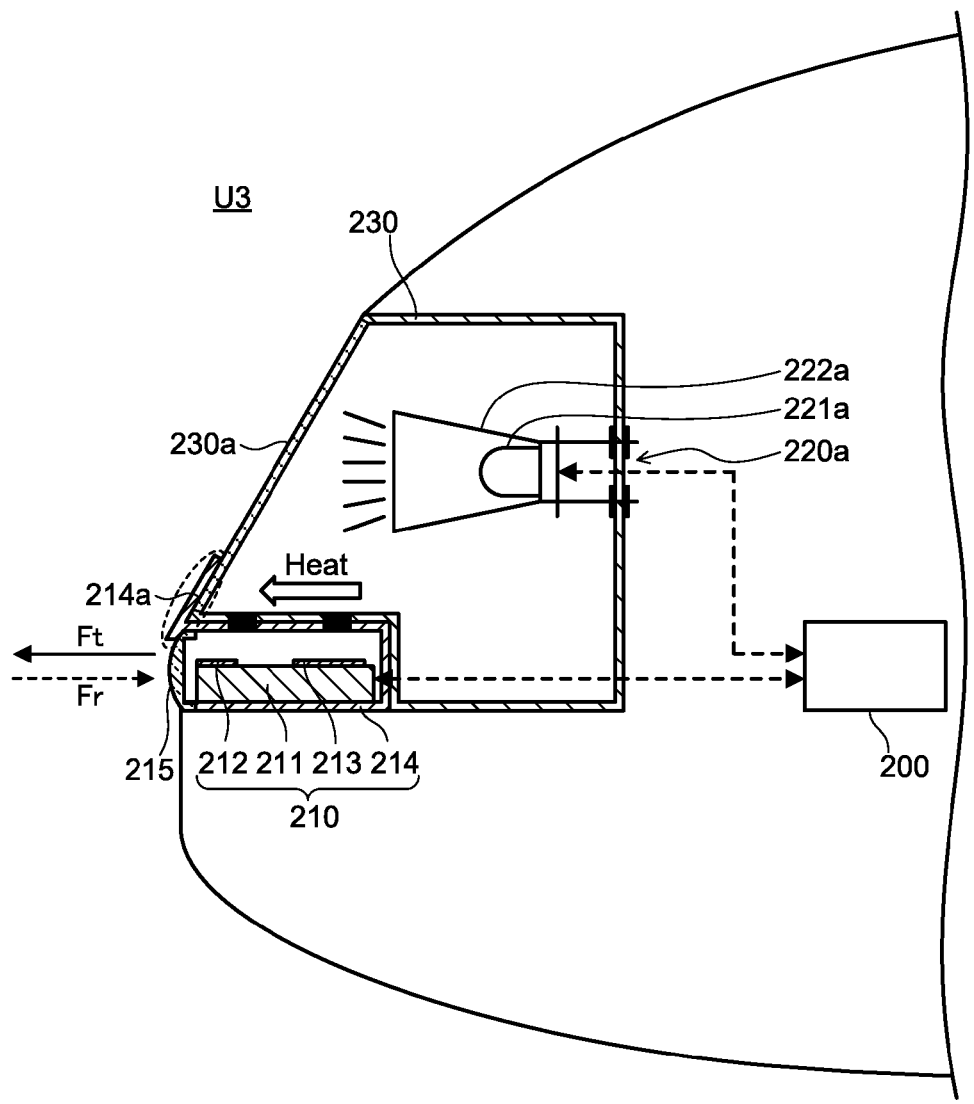
FIG. 20 is a sectional side view illustrating an example of a configuration of the in-vehicle light apparatus according to Embodiment 8.

Light apparatus U3 according to Embodiment 8 includes radar apparatus 210, lamps 220a, 220b, and 220c, and Electronic Control Unit (ECU) 200 (see FIG. 20).

In light apparatus U3 according to Embodiment 8, three lamps 220a, 220b, and 220c are arranged adjacent to each other along the left-right direction, and radar apparatus 210 is disposed on the lower side of lamps 220a, 220b, and 220c.

Radar apparatus 210 according to Embodiment 8 transmits an electromagnetic wave in an obliquely right direction (+X direction) with respect to the direction of travel of the vehicle, and performs detection of an object present in that direction. Then, a radar apparatus (not illustrated) built in the left headlight performs detection of an object present in the obliquely leftward direction with respect to the direction of travel of the vehicle.

Figure 21:
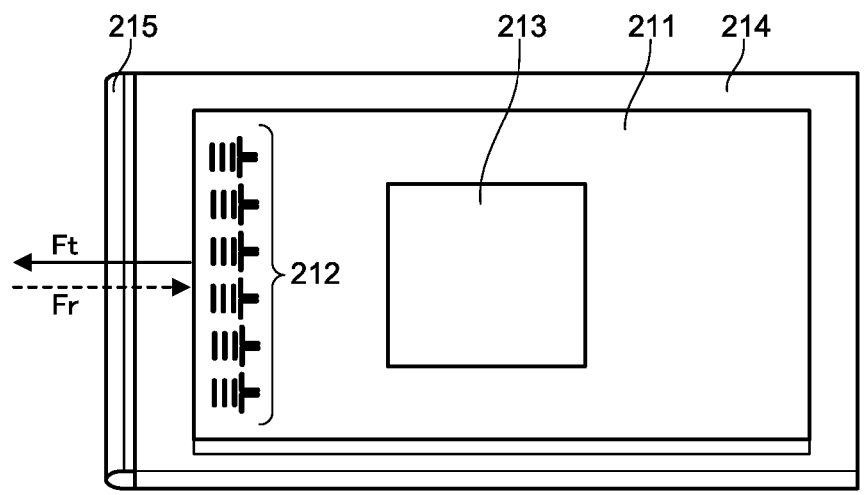
FIG. 21 is a plan view of a radar apparatus according to Embodiment 8 viewed from above.

FIG. 20 is a sectional side view illustrating an example of the configuration of the light apparatus U3 according to this embodiment. FIG. 21 is a plan view of radar apparatus 210 according to Embodiment 8 as seen from above.

Lamp 220a includes light source 221a and reflector 222a. Lamp 220a is stored in lamp housing 230 together with lamps 220b and 220c.

Lamp housing 230 forms a storage space in the front end region of the vehicle, and houses radar apparatus 210 and lamps 220a, 220b, and 220c in the storage space. Lamp housing 230 has front cover 230a that covers the front face of the storage space. Lamp housing 230 is made of, for example, a resin material (for example, polycarbonate and the like). Further, front cover 230a is formed of, for example, a resin material (for example, polycarbonate and the like) having light permeability.

Light source 221a is, for example, an incandescent bulb, and emits light toward the front (here, the direction about 30 degrees from +X direction toward the −Y side). Light source 221a is attached to the rear side wall of lamp housing 230. A light source having a condensing lens may be used as light source 221a.

Reflector 222a is disposed so as to surround the periphery of light source 221a to collect light emitted from light source 221a and adjust the irradiation range of light. Reflector 222a is formed of, for example, a quadrangular pyramid-shaped cylindrical member whose opening directed to the front side and increasing in diameter as it goes toward the front. Reflector 222a is formed of a metal member such as an aluminum material, for example. Further, reflector 222a may be formed by metallizing a resin member.

Lamps 220b and 220c have the same configuration as lamp 220a, and are each made up of the light source and a reflector surrounding the light source. Lamps 220a, 220b, and 220c are equipped with a system that automatically shifts the irradiation area of the headlight, for example, referred to as an adaptive high beam system.

In the following description, any one of lamp 220a, lamp 220b, and lamp 220c is abbreviated as "lamp 220", "light source 221", and "reflector 222" unless otherwise specifically distinguished.

Radar apparatus 210 includes circuit board 211, antenna 212, signal processing IC 213, and separator 214.

In addition, radar apparatus 210 according to Embodiment 8 transmits and receives an electromagnetic wave to and from the front regions outside a vehicle via dielectric lens 215. In other words, dielectric lens 215 according to Embodiment 8 also functions as a cover member that protects radar apparatus 210 (hereinafter also referred to as "cover member 215").

Circuit board 211 is a board on which antenna 212 and signal processing IC 213 are mounted. As circuit board 211, for example, a Printed Circuit Board (PCB), a semiconductor substrate with built-in signal processing IC 213, or the like is used.

In view of miniaturization of light apparatus U3, circuit board 211 is disposed on the lower side of reflector 222 such that the board surface extends along the horizontal direction. Circuit board 211 may be disposed on the upper side of reflector 222.

Antenna 212 is disposed in the front area of the board surface of circuit board 211 and transmits electromagnetic wave Ft forward (+X direction), and receives reflected wave Fr which is the electromagnetic wave reflected by a target.

Antenna 212 comprises, for example, an end-fire array antenna having directional characteristics in the direction of the front end side of circuit board 211. The end-fire array antenna is configured to include a plurality of strip conductors which are arranged such that the longitudinal direction thereof are in parallel, and transmits and receives electromagnetic waves along the direction in which the plurality of strip conductors are arranged. Antenna 212 is composed of, for example, six end-fire array antennas (hereinafter also referred to as "antenna elements") arranged adjacent to each other along ±Y direction. Antenna 212 is formed as a phased array antenna by six antenna elements.

Antenna 212 is disposed on the front side of reflector 222. In other words, antenna 212 is disposed so as not to overlap with reflector 222 in plan view. This prevents antenna 212 and reflector 222 from facing each other, thereby preventing the generation of the standing wave between antenna 212 and reflector 222.

For example, signal processing IC 213 transmits a high-frequency drive signal to antenna 212 to transmit an electromagnetic wave (for example, an electromagnetic wave in the millimeter wave band) from antenna 212, or performs reception processing for a received signal relating to a reflected wave received by antenna 212. Then, detection of the distance to the target (for example, a vehicle or a person), the azimuth where the target is present, and the reflection intensity and speed of the target and the like is performed by reception processing (for example, detection wave processing or frequency analysis processing) by signal processing IC 213. Here, since the reception processing by signal processing IC 213 is the same as a known configuration, detailed description thereof is omitted here.

Separator 214 is disposed so as to partition a space between lamp 220 and radar apparatus 210, and shields the transmission of radiant heat between lamps 220a, 220b, and 220c and radar apparatus 210. Specifically, separator 214 suppresses propagation of radiant heat emitted from light source 221 to circuit board 11 (for example, signal processing IC 213). Accordingly, radiant heat emitted from light source 221 suppresses overheating of signal processing IC 213 mounted on circuit board 211. Separator 214 also functions to suppress propagation of an electromagnetic wave that arrives from the front and is reflected by reflector 222 to antenna 212.

Note that separator 214 according to Embodiment 8 is disposed so as to surround circuit board 211, and also functions as a radar housing that houses circuit board 211. Separator 214 is mounted on the lower surface of lamp housing 230 by using a fixing member (for example, a screw) in a state in which circuit board 211 is stored.

Further, separator 214 extends to the front side relative to circuit board 211 and has an extending portion 214a that contacts dielectric lens 215. In other words, separator 214 functions to absorb the radiant heat emitted from light source 221 and transfers the heat to the front end face of dielectric lens 215 to increase the temperature of the front end face of dielectric lens 215 (Heat in FIG. 20 represents the heat that separator 214 may transfer). In FIG. 20, although extending portion 214a of separator 214 is in contact with both the front end surface of dielectric lens 215 and the front end face of front cover 230a, it may be configured to come into contact with at least the front end face of dielectric lens 215.

The material of separator 214 is preferably a material having higher thermal conductivity than the material of lamp housing 230 (for example, a resin material), and typically, a metal member (for example, aluminum or copper) or a carbon material is used.

Dielectric lens 215 (corresponding to "cover member" of the present disclosure) is mounted on the window portion formed on the front face of separator 214, narrows the beam of electromagnetic wave Ft transmitted by antenna 212, transmits the same forward, and condenses the reflected wave returned from the target to antenna 212.

Dielectric lens 215 is, for example, formed of a semi-cylindrical or parabolic cylindrical lens, which protrudes in +X direction and extends along the ±Y direction. Dielectric lens 215 of the semi-cylindrical shape or the parabolic cylinder shape has substantially the same shape in side cross section at any position in ±Y direction, so that a refractive angle of the reflected wave reaching the different positions in the ±Y direction can preferably be made to be the same. As a result, the reflected waves coming from the outside of the apparatus are prevented from entering antenna 212 from the various directions (for example, +Y direction side −Y direction side with respect to antenna 212). In other words, it is possible to prevent deterioration in the accuracy of detection of an object (for example, deterioration in accuracy due to mutual interference or deterioration in accuracy due to a change in phase difference).

In this embodiment, although dielectric lens 215 also functions as a cover member for protecting antenna 212 or the like, a member having no electromagnetic wave condensing function may be mounted as a cover member for protecting antenna 212 or the like.

ECU 200 (corresponding to "control apparatus" of the present disclosure) controls a driving circuit of lamp 220 to control ON/OFF of lighting of lamp 220. ECU 200 includes, for example, a Central Processing Unit (CPU), a Read Only Memory (ROM), a Random Access Memory (RAM), an input port, an output port, and the like. ECU 200 is connected to radar apparatus 210 via an in-vehicle network and exchanges necessary data and control signals with each other.

[Configuration of ECU]

Next, an example of configuration of ECU 200 according to Embodiment 8 will be described with reference to FIG. 22 and FIG. 23.

Figure 22:
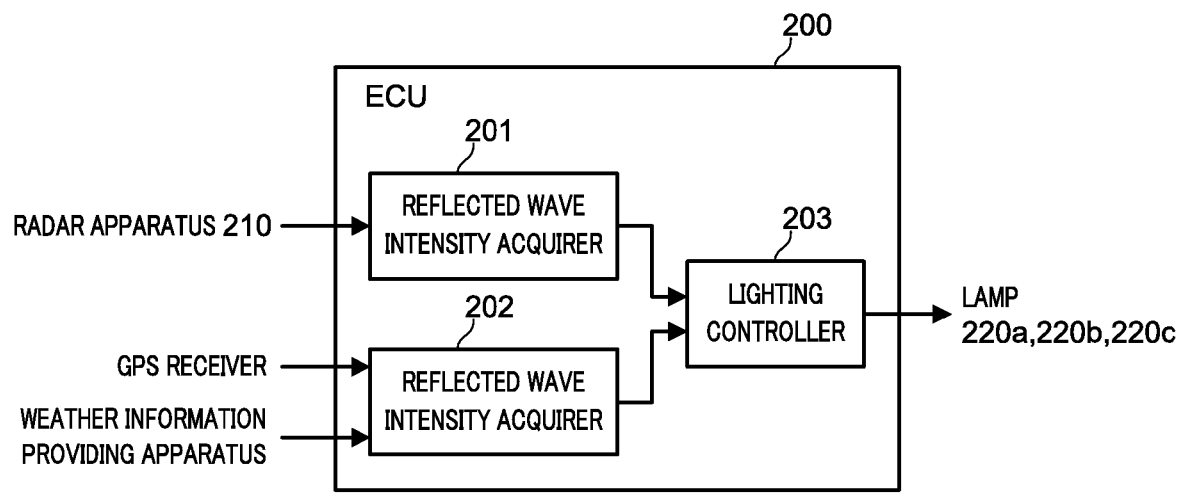
FIG. 22 is a block diagram illustrating an example of a configuration of an ECU according to Embodiment 8.

FIG. 22 is a block diagram illustrating an example of the configuration of ECU 200 according to Embodiment 8.

ECU 200 includes reflected wave intensity acquirer 201, weather information acquirer 202, and lighting controller 203.

Reflected wave intensity acquirer 201 acquires the intensity of the reflected wave detected by radar apparatus 210 from radar apparatus 210. Reflected wave intensity acquirer 201 according to Embodiment 8 uses a reflected wave power as information indicating the intensity of the reflected wave. However, as information indicating the intensity of the reflected wave, other information may be used instead of the reflected wave power.

The reflected wave power detected by radar apparatus 210 is the magnitude of the reflected wave reflected from the target present in the front and returned to antenna 212 among the electromagnetic waves transmitted by antenna 212 forward. The reflected wave power is detected by signal processing IC 213 receiving processing the electromagnetic wave received by antenna 212.

Weather information acquirer 202 acquires weather information at present at the travelling position of the vehicle on which it is mounted. Weather information acquirer 202 acquires information on the travelling position of the vehicle from a GPS receiver mounted on the vehicle, for example. Weather information acquirer 202 acquires weather information of the travelling position of the vehicle from a weather information providing apparatus (for example, a weather information providing server provided by a public institution).

However, the method by which weather information acquirer 202 acquires weather information is arbitrary, and a method of identifying weather information based on an image outside the vehicle reflected on the in-vehicle camera may be used, or a configuration such that the weather information is set by a person on board is also applicable.

Based on the reflected wave power acquired by reflected wave intensity acquirer 201, lighting controller 203 determines the presence or absence of adhesion of ice, snow, or frost to cover member 215 disposed in front of radar apparatus 210, and controls ON/OFF of the lamp according to the result of determination. Specifically, lighting controller 203 turns on light source 221 of lamp 220 when ice, snow, frost, or the like is attached to cover member 215, uses radiant heat from light source 221 to increase the temperature of cover member 215 via separator 214 or front cover 230a. Accordingly, the ice, snow, frost, or the like adhering to cover member 215 are removed from the front face of cover member 215 by melting or evaporating.

Figure 23:
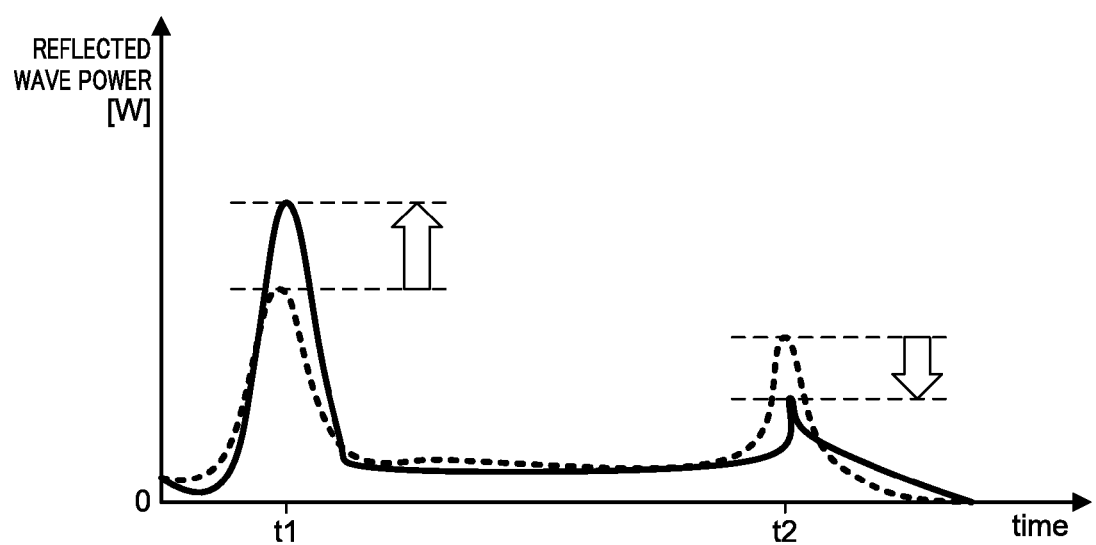
FIG. 23 illustrates the behavior of the reflected wave when ice, snow or the like is attached to a front face of a cover member.

FIG. 23 is a diagram illustrating changes in behavior of reflected wave power when ice, snow or the like adheres to the front face of cover member 215. The dotted line graph in FIG. 23 represents a behavior of reflected wave power when ice, snow or the like is not attached to the front face of cover member 215, and the solid line graph represents the behavior of reflected wave power when ice, snow or the like is attached to the front face of cover member 215.

The horizontal axis of FIG. 23 represents time, and the vertical axis represents reflected wave power [W]. The peak appearing at a timing t1 in FIG. 23 represents a reflected wave from the position of cover member 215, and the peak appearing at a timing t2 represents a reflected wave from the target in front of cover member 215.

In general, when an electromagnetic wave is transmitted from antenna 212 of radar apparatus 210, a part of the electromagnetic wave is reflected by cover member 215 and returns to antenna 212. When ice, snow or the like is adhere to the front face of cover member 215, the amount of electromagnetic wave reflected by cover member 215 (that is, reflected wave power) increases due to the influence of the ice, snow or the like. When ice, snow or the like adheres to the front face of cover member 215, the reflected wave power from the target outside cover member 215 is lowered due to the influence of the ice, snow or the like.

Lighting controller 203 determines whether or not ice, snow or the like is adhered to cover member 215 in consideration of the above behavior. Specifically, when the reflected wave power from the position of cover member 215 (reflected wave power detected at the timing of t1) is equal to or greater than a predetermined threshold, lighting controller 203 determines that ice, snow or the like is attached to cover member 215, and turns ON lamp 220 in order to execute temperature rising processing for cover member 215. In addition, lighting controller 203 determines that ice, snow or the like have been removed from cover member 215 when the reflected wave power from the position of cover member 215 becomes below a predetermined threshold during the temperature raising process, and then turns off lamp 220.

Lighting controller 203 further controls ON/OFF of lamp 220 based on the weather information acquired by the weather information acquirer 202 in order to avoid unnecessary lighting. That is, when the deposit on cover member 215 is mud or the like, the deposit cannot be removed in many cases even when lamp 220 is turned on and the temperature of cover member 215 is increased. From this point of view, lighting controller 203 turns on lamp 220 only when the weather information is snow.

Note that the above functions of ECU 200 are realized by CPU referring to a control program or various data stored in ROM or RAM, for example.

[Operation Flow of ECU]

Next, an example of the operation of ECU 200 according to this embodiment will be described with reference to FIG. 24.

Figure 24:
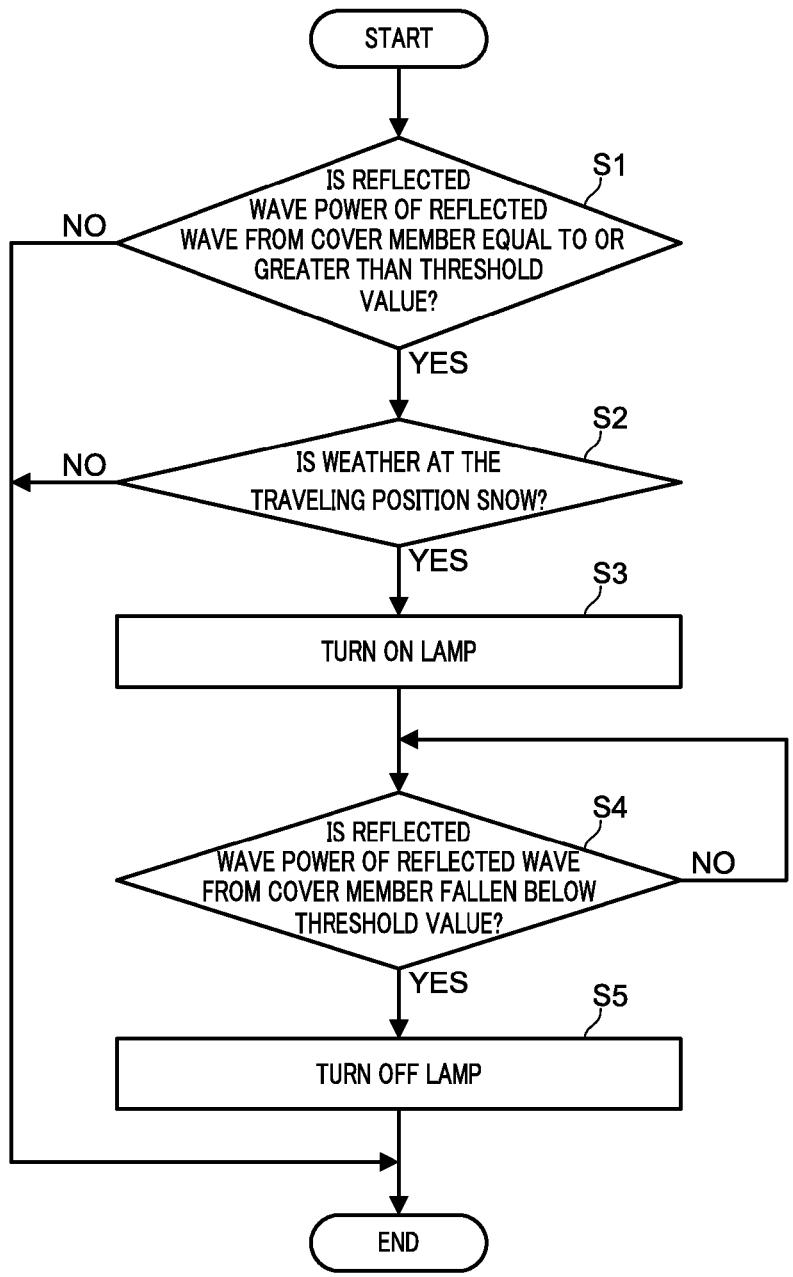
FIG. 24 illustrates a flowchart illustrating an example of an operation of the ECU according to Embodiment 8.

FIG. 24 is a flowchart illustrating an example of the operation of ECU 200. In the flowchart illustrated in FIG. 24, for example, ECU 200 is executed at a predetermined interval (for example, every 10 minutes) according to a computer program.

In step S1, first, ECU 200 determines whether or not the reflected wave power from cover member 215 is equal to or greater than the threshold based on the behavior of the reflected wave acquired from radar apparatus 210. At this time, if the reflected wave power from cover member 215 is equal to or greater than the threshold (S1: YES), ECU 200 advances the process to step S2. On the other hand, when the reflected wave power from cover member 215 is below threshold (S1: NO), ECU 200 ends the operation flow of FIG. 24 without executing any particular processing.

In step S1, when an electromagnetic wave is transmitted from antenna 212, ECU 200 identifies the reflected wave detected at a preset timing as a reflected wave from cover member 215, and detects the reflected wave power (see FIG. 23).

In step S2, ECU 200 determines whether or not the weather at present is snow based on the weather information of the travelling position acquired from the weather information providing apparatus. At this time, if the weather at present is snow (S2: YES), ECU 200 advances the process to step S3. On the other hand, when the weather of at present is not snow (S2: NO), ECU 200 terminates the operation flow of FIG. 24 without executing any particular processing.

In step S3, ECU 200 controls a driving circuit of lamp 220 so that lamp 220 is turned on. Then, the process proceeds to step S4.

In step S4, ECU 200 determines whether or not the reflected wave power from cover member 215 has decreased to a level below the threshold based on the behavior of the reflected wave acquired from radar apparatus 210. At this time, ECU 200 waits for reflected wave power from cover member 215 to fall to a value below the threshold (S4: NO), and when reflected wave power from cover member 215 falls to a value below threshold (S4: YES), the process proceeds to step S5.

In step S5, the ECU 200 controls the driving circuit of lamp 220 so as to turn off lamp 220. Then, the operation flow illustrated in FIG. 24 is ended.

In-vehicle light apparatus U3 according to Embodiment 8 performs the above-described process, and when ice, snow or the like adheres to cover member 215 (here, dielectric lens 215), the temperature of cover member 215 is increased, and ice, snow or the like is removed correspondingly.

[Effect of One Example]

As described above, control apparatus 200 of in-vehicle light apparatus U3 according to Embodiment 8 includes reflected wave intensity acquirer 201 configured to acquire reflected wave power of an electromagnetic wave transmitted forward (first direction) by radar apparatus 210, and lighting controller 203 configured to determine adhesion of ice, snow, or frost to cover member (for example, dielectric lens) 215 disposed on the front side of radar apparatus 210 based on the reflected wave power and control ON/OFF of lamp 220 according to the result of determination.

Accordingly, according to in-vehicle light apparatus U3 of Embodiment 8, when ice, snow, or frost is attached to cover member 215 disposed in front of radar apparatus 210, cover member 215 can be heated by the radiant heat of lamp 220 to perform snow melting or defrosting. Accordingly, it is possible to suppress a decrease in output gain and a decrease in reception gain in radar apparatus 210 due to ice, snow, or frost adheres to cover member 215.

Further, control apparatus 200 according to this embodiment further includes weather information acquirer 202 for acquiring at present weather information at the travelling position of the vehicle on which the vehicle is mounted, and lighting controller 203 determines the adhesion of ice and snow to cover member 215 based on the reflected wave power and the weather information, and controls ON/OFF of lamp 220.

Accordingly, it is possible to determine the adhesion of ice, snow, or frost to cover member 215 disposed in front of radar apparatus 210 more accurately, and unnecessary lighting can be prevented.

(Modified Modes)

Embodiments of the present invention are not limited to the above-described Embodiment 8, but various modified modes are also conceivable.

In the above-mentioned Embodiment 8, a mode including reflected wave intensity acquirer 201, weather information acquirer 202, and lighting controller 203 is illustrated as an example of ECU 200. However, ECU 200 does not necessarily have to have weather information acquirer 202, and lighting controller 203 may control ON/OFF of lamp 220 only from the information of reflected wave power.

In the above Embodiment 8, as an example of a configuration for raising the temperature of dielectric lens 215 using the radiant heat emitted from light source 221, separator 214 that absorbs radiant heat emitted from light source 221 and transmits it to dielectric lens 215. However, the transmission path of the radiant heat emitted from light source 221 to dielectric lens 215 includes a transmission path from front cover 230a to dielectric lens 215 in addition to separator 214. Therefore, the light apparatus U3 according to the present disclosure does not necessarily have to have separator 214.

Further, in the above third to Embodiment 8, the headlight is illustrated as an example of the target to be applied of light apparatus U3, but light apparatus U3 according to the present disclosure can be applied to a tail light, a small light or the like.

Further, in Embodiments 8, as an example of light apparatus U3, a mode of a horizontal type radar unit 210 using an end-fire array antenna is illustrated. However, light apparatus U3 according to the present disclosure can be applied not only to horizontal type radar unit 210 but also to a vertical type radar unit.

In the above-mentioned Embodiment 8, an end-fire array antenna formed on circuit board 211 is illustrated as an example of antenna 212 of radar apparatus 210. However, in the embodiment of the present invention, the configuration of antenna 212 is arbitrary, and may be made up of a Yagi array antenna, a Fermi antenna, a post wall waveguide antenna, a post wall horn antenna, a horn antenna, or the like.

In Embodiment 8 described above, a mode in which three lamps 220 are provided as an example of light apparatus U3 is described. However, light apparatus U3 according to the embodiment of the present invention may have only one lamp 220.

According to the control apparatus of the in-vehicle light apparatus according to an example of the present disclosure, decrease in radar performance caused by ice, snow or the like adhering to the cover member disposed in front of the radar apparatus is suppressed.

The control apparatus according to an example of the present disclosure is an in-vehicle light apparatus control apparatus that integrally includes a lamp and a radar apparatus for monitoring a region in a first direction outside the vehicle, and includes: a reflected wave intensity acquirer for acquiring the intensity of the reflected wave of the electromagnetic wave transmitted in the first direction by the radar apparatus; and a lighting controller configured to determine adhesion of ice, snow, or frost to a cover member disposed on the first direction side of the radar apparatus based on the intensity of the reflected wave and control the lamp to ON and OFF according to the result of determination.

The control apparatus according to an example of the present disclosure further includes a weather information acquirer configured to acquire weather information at present at a travelling position of the vehicle, and the lighting controller is configured to determine adhesion of ice, snow, or frost to the cover member based on the intensity of the reflected wave and the weather information, and control the lamp to ON and OFF according to the result of determination.

In the control apparatus according to an example of the present disclosure, when the intensity of the reflected wave from the cover member is increased, the lighting controller turns the lamp ON for processing to increase the temperature of the cover member, and turns the lamp OFF when the intensity of the reflected wave from the cover member is reduced during the processing.

Embodiment 9

An antenna apparatus for radar configured to detect the position of an object (hereinafter also referred to as "target") in a non-contact manner using an electromagnetic wave in a frequency band of millimeter waves or microwaves.

This type of antenna apparatus is mounted on, for example, a vehicle or a ship. For example, Japanese Patent Application Laid-Open No. 2008-186741 describes that the antenna apparatus is disposed in a vehicle in an integral manner with a lamp that irradiates the outside of the vehicle. As another prior art document, Patent Application Laid-Open No. 62-090121 can be cited.

Incidentally, in this type of antenna apparatus, in general, from the viewpoint of protection from flying objects or the like, an antenna is disposed in a cover member (for example, a bumper member of a vehicle), and the antenna is configured to transmit and receive an electromagnetic wave via the cover member.

However, since the cover member is disposed with the front face exposed to the outside, water droplets, snow, raindrops, mud, dirt, or the like on the front face of the cover member may adhere to the cover member when the vehicle is driven in rainy weather. (Hereinafter referred to as "water droplets and the like"). Such water droplets and the like are factors that greatly reduce the output gain and reception gain of the antenna apparatus.

In view of such problems described above, an example of the present disclosure provides an antenna apparatus and in-vehicle light apparatus capable of suppressing the decrease in output gain and the decrease in reception gain due to water droplets and the like adhering to the front face of the cover member.

An example of the configuration of antenna apparatus 310 according to Embodiment 9 will be described with reference to FIG. 25 to FIG. 31.

In each drawing, in order to clarify the positional relationship of each component, a common orthogonal coordinate system based on the forward direction in which antenna apparatus 310 transmits an electromagnetic wave to the outside apparatus (that is, the direction subject to detection of an object) (X, Y, Z). In the following description, a plus direction of the X-axis represents the front direction in which antenna apparatus 310 transmits an electromagnetic wave to the outside the apparatus (hereinafter referred to as "forward direction"), a plus direction of the Y-axis represents the left side direction side of antenna apparatus 310 (hereinafter abbreviated as "leftward direction") and a plus direction of the Z-axis represents upward of antenna apparatus 310 (hereinafter abbreviated as "upward direction").

In the following description, +Z direction corresponds to the upward of the vehicle, and a direction about 30 degrees in the +Y direction from +X direction corresponds to the direction of travel of the vehicle.

Figure 25:
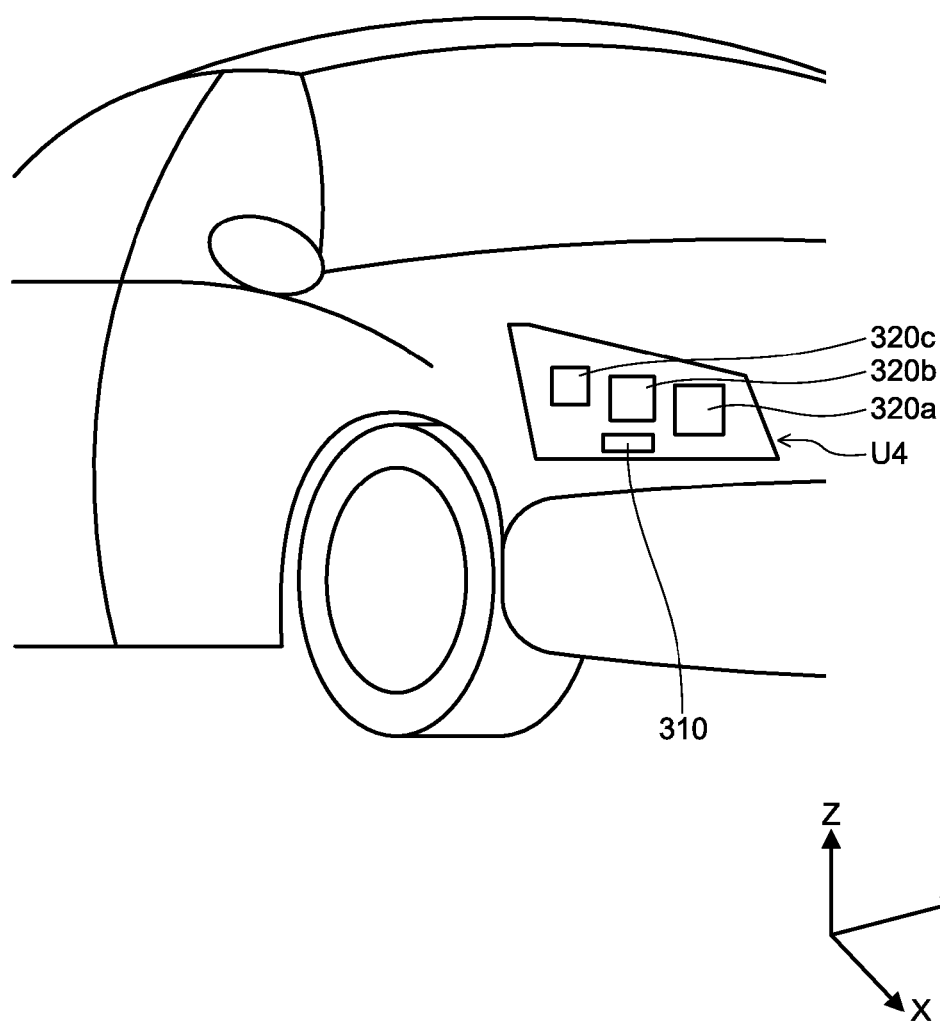
FIG. 25 is a perspective view illustrating a state of installation in a vehicle of an antenna apparatus according to Embodiment 9.

FIG. 25 is a perspective view illustrating a state of installation in the vehicle of antenna apparatus 310 according to Embodiment 9.

Antenna apparatus 310 according to Embodiment 9 is mounted on a vehicle and is disposed in an integral manner with lamps 320a, 320b, and 320c that irradiate the front of the vehicle. More specifically, antenna apparatus 310 according to Embodiment 9 is disposed adjacent to the lower sides of three lamps 320a, 320b, and 320c arranged adjacent to each other along the left-right direction, and constitutes in-vehicle light apparatus U4 (here, vehicle headlight) together with lamps 320a, 320b, and 320c.

Figure 26:
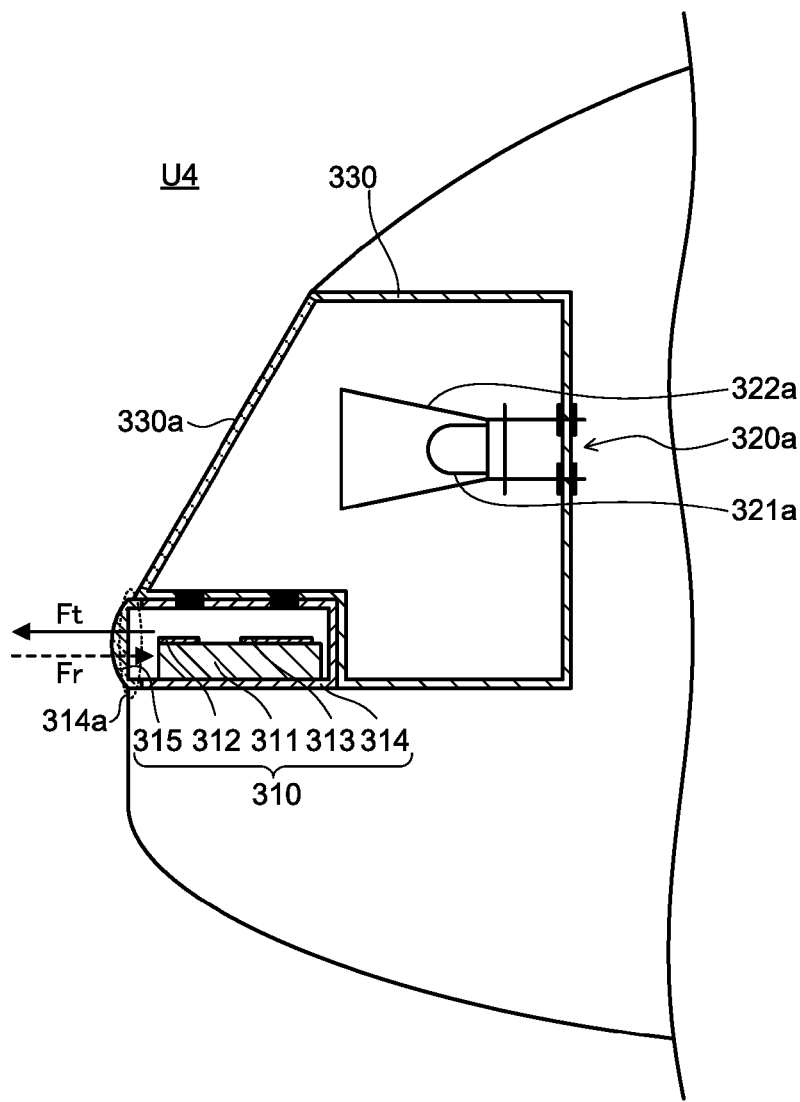
FIG. 26 is a sectional side view illustrating an example of a configuration of an antenna apparatus according to Embodiment 9.
Figure 26:
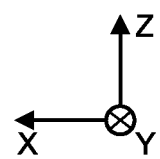
Figure 27:
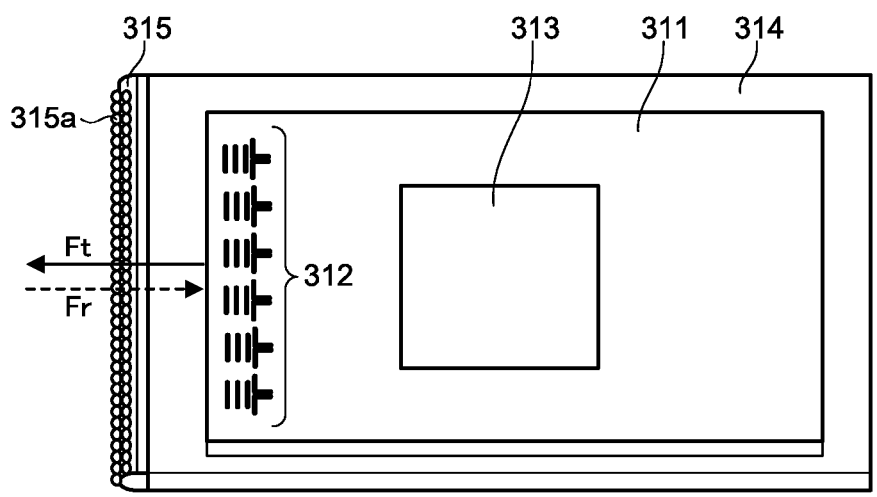
FIG. 27 is a plan view of antenna apparatus according to Embodiment 9 viewed from above.
Figure 27:
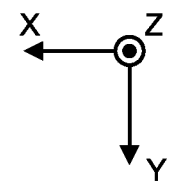

FIG. 26 is a sectional side view of antenna apparatus 310 according to this embodiment. FIG. 27 is a drawing antenna apparatus 310 viewed from above according to this embodiment.

Antenna apparatus 310 according to Embodiment 9 is attached to the lower side of lamp housing 330 storing lamps 320a, 320b, and 320c by a fixing member (for example, a screw member).

Lamp 320a is formed of light source 321a (for example, an LED lamp or an incandescent lamp) and a reflector 322a which is disposed so as to surround light source 321a and condenses light so that the light emitted from light source 321a is directed forward. Lamps 320b and 320c have the same configuration as lamp 320a, and are each made up of the light source and a reflector surrounding the light source.

Lamp housing 330 forms a storage space in the front end region of the vehicle, and stores lamp 320a, 320b, and 320c in the storage space. Lamp housing 330 has front cover 330a that covers the front face of the storage space. Lamp housing 330 is made of, for example, a resin material (for example, polycarbonate and the like). Further, front cover 330a is formed of, for example, a resin material (for example, polycarbonate and the like) having light permeability.

Antenna apparatus 310 includes circuit board 311, antenna 312, signal processing IC 313, radar housing 314, and dielectric lens 315.

Circuit board 311 is a board on which antenna 312 and signal processing IC 313 are mounted. As circuit board 311, for example, a Printed Circuit Board (PCB), a semiconductor substrate with built-in signal processing IC 313, or the like is used.

Circuit board 311 is disposed such that the board surface extends in the longitudinal direction, and typically, the board surface extends along the horizontal direction. Note that circuit board 311 is disposed on the upper side or lower side of lamps 320a, 320b, and 320c in terms of reduction in size of light apparatus U4 (in this example, the lower side).

In other words, radar unit 310 constitutes a horizontal type millimeter wave radar in which circuit board 311 is disposed horizontally. As a result, radar unit 310 is thinner than lamp unit 320 in the ±Z directions.

Antenna 312 is disposed in the front area of the board surface of circuit board 311 and transmits electromagnetic wave Ft forward (+X direction), and receives reflected wave Fr which is the electromagnetic wave reflected by a target.

Antenna 312 is, for example, an end-fire array antenna having directional characteristics in the direction of the front end side of circuit board 311. The end-fire array antenna is configured to include a plurality of strip conductors which are arranged such that the longitudinal direction thereof are in parallel, and transmits and receives electromagnetic waves along the direction in which the plurality of strip conductors are arranged. Antenna 312 is composed of, for example, six end-fire array antennas (hereinafter also referred to as "antenna elements") arranged adjacent along ±Y direction. Antenna 312 is formed as a phased array antenna by six antenna elements.

For example, signal processing IC 313 transmits a high-frequency drive signal to antenna 312 to cause antenna 312 to transmit an electromagnetic wave (for example, an electromagnetic wave in a millimeter wave band), and perform reception processing of a received signal relating to the reflected wave that antenna 312 has received. Then, detection of the distance to the target (for example, a vehicle or a person), the azimuth where the target is present, and the reflection intensity and speed of the target and the like is performed by reception processing (for example, detection wave processing or frequency analysis processing) by signal processing IC 313. Here, since the reception processing by signal processing IC 313 is the same as a known configuration, detailed description thereof is omitted here.

Radar housing 314 (corresponding to a "housing" in the present disclosure) accommodates circuit board 311 and supports dielectric lens 315 in front of circuit board 311. Radar housing 314 typically accommodates circuit board 311 in a substantially sealed state.

On the front face of radar housing 314, window portion 314a for transmitting and receiving electromagnetic waves between antenna 311 and a front region outside the vehicle is formed, and dielectric lens 315 is attached to window portion 314a.

Examples of the material of radar housing 314 includes a metal material or a resin material is used. When a resin material is used as radar housing 314, radar housing 314 and dielectric lens 315 may be integrally formed of the same resin material.

Dielectric lens 315 (corresponding to "cover member" in the present disclosure) is disposed such that the position of installation of antenna 312, for example, is focused, narrows the beam of the electromagnetic wave transmitted by antenna 312, transmits the same forward, and condenses the reflected wave reflected by the target on antenna 312. Note that dielectric lens 315 is disposed with the front face exposed to the outside of the vehicle, and also functions as a cover member of antenna 312.

Dielectric lens 315 is, for example, formed of a semi-cylindrical or parabolic cylindrical lens, which protrudes in +X direction and extends along the ±Y direction. Dielectric lens 315 of the semi-cylindrical shape or the parabolic cylinder shape has substantially the same shape in side cross section at any position in ±Y direction, so that a refractive angle of the reflected wave reaching the different positions in the ±Y direction can preferably be made to be the same. As a result, the reflected waves coming from the outside of the apparatus are prevented from entering antenna 312 from the various directions (for example, +Y direction side −Y direction side with respect to antenna 312). In other words, it is possible to prevent deterioration in the accuracy of detection of an object (for example, deterioration in accuracy due to mutual interference or deterioration in accuracy due to a change in phase difference).

Figure 28:
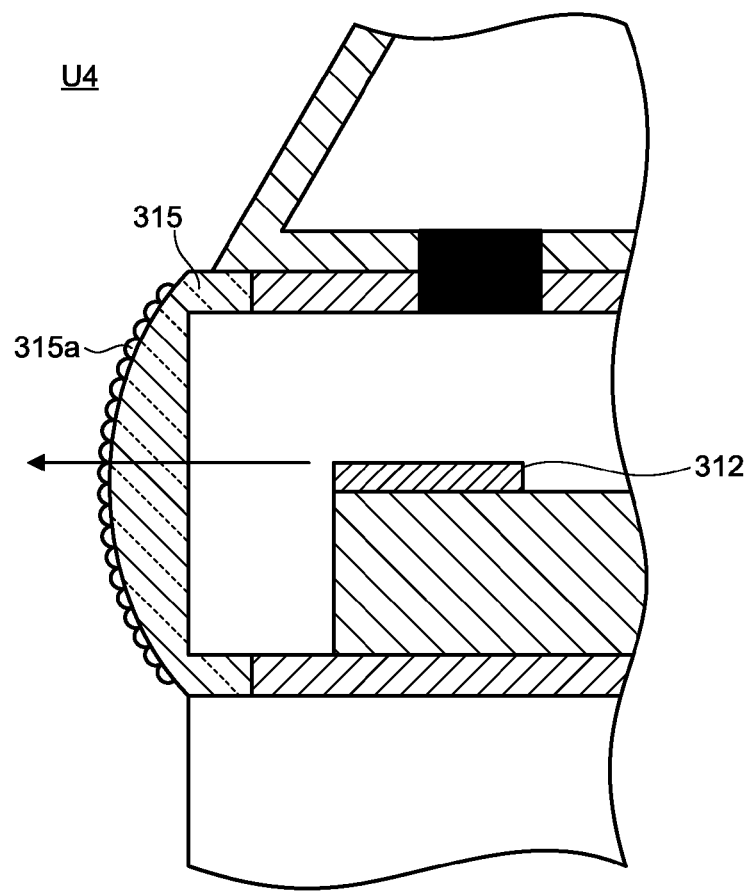
FIG. 28 is an enlarged view illustrating a front face of a dielectric lens according to Embodiment 9.
Figure 28:
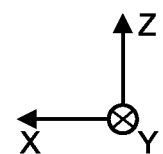
Figure 29:
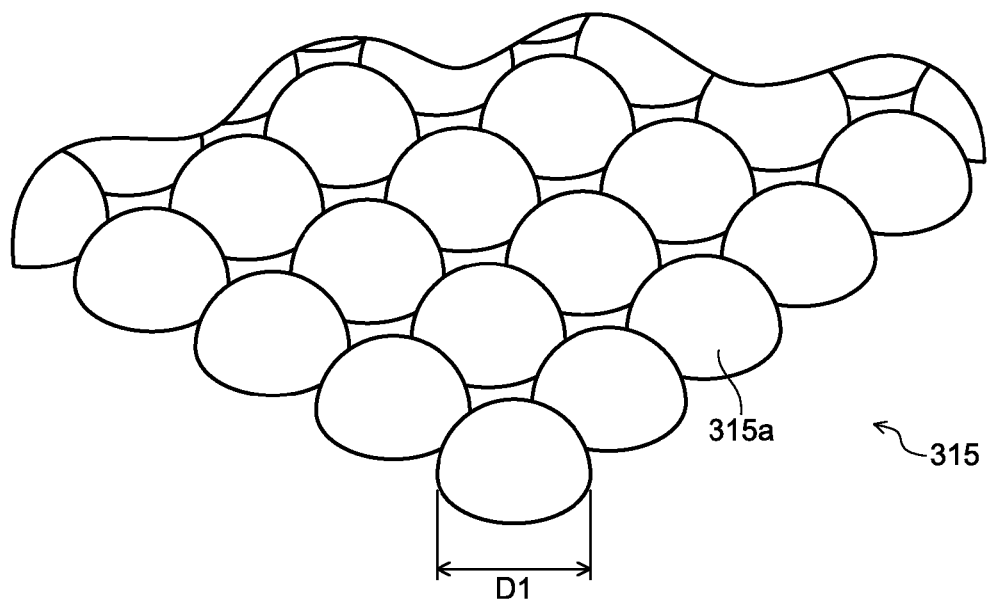
FIG. 29 is an enlarged view illustrating the front face of the dielectric lens according to Embodiment 9.

FIG. 28 and FIG. 29 is an enlarged view illustrating a state of the front face of dielectric lens 315.

Dielectric lens 315 has an irregular structure formed by a plurality of protrusions 315a on the front face (that is, the surface exposed to the outside). The irregular structure formed on the surface of the object is known to change the surface free energy and retain water repellency on the surface of the object (also referred to as the Lotus effect). Dielectric lens 315 of Embodiment 9 utilizes such a phenomenon. In other words, dielectric lens 315 according to Embodiment 9 is configured to have a water repellent function on the front face by providing an irregular structure on the front face.

Accordingly, when water adheres to the front face of dielectric lens 315, the water becomes water droplets and rolls down while entwining mud and other foreign matters. That is, the irregular structure acts to suppress adhesion of water droplets and the like to the front face of dielectric lens 315.

In addition, as an example of applying the Lotus effect, as in Japanese Patent Application Laid-Open No. 62-090121, there is widely known a font character that has improved water repellency by providing an irregular structure on the surface. However, generally, if an irregular structure is provided on the surface of the resin arranged outside the millimeter wave radar, adverse effects such as changes in the beam direction of the millimeter wave radar and deterioration of reflection characteristics may occur.

In this regard, as described later, dielectric lens 315 according to the present disclosure has a characteristic in that an irregular structure that can suppress the attachment of snow and water droplets to the surface without causing degradation of the performance of the millimeter wave radar is employed.

The irregular structure formed on the front face of dielectric lens 315 is, for example, formed by embossing dielectric lens 315. In addition, the method of forming the irregular structure is also arbitrary, for example, the method of attaching protrusions 315a on dielectric lens 315 may be used.

Protrusions 315a constituting the irregular structure has, for example, a dome shape (that is, a hemispherical shape). Size D1 of protrusions 315a (hereinafter, it represents the diameter of protrusion 315a in plan view) is preferably as small as possible in terms of securing water repellency on the front face of dielectric lens 315 and in terms of suppressing lowering of the output gain and the reception gain of antenna 312 and is typically set to 1000 μm at the maximum, and more preferably, 100 μm as the maximum in plan view.

Note that size D1 of protrusions 315a is preferably set based on the wavelength of the electromagnetic wave transmitted and received by antenna 312 when considering the influence on the output gain and reception gain of antenna 312. In particular, if size D1 of protrusions 315a is set to λ/40 or less (where is the free-space wavelength of the electromagnetic wave transmitted and received by antenna 312) in plan view, the decrease in output gain and decrease in reception gain caused by protrusion 315a is almost negligible. The size of λ/40 corresponds to approximately 100 μm when the frequency of the electromagnetic wave transmitted and received by antenna 312 is 80 GHz, and to approximately 300 μm when the frequency of the electromagnetic wave transmitted and received by antenna 312 is 24 GHz.

Figure 30:
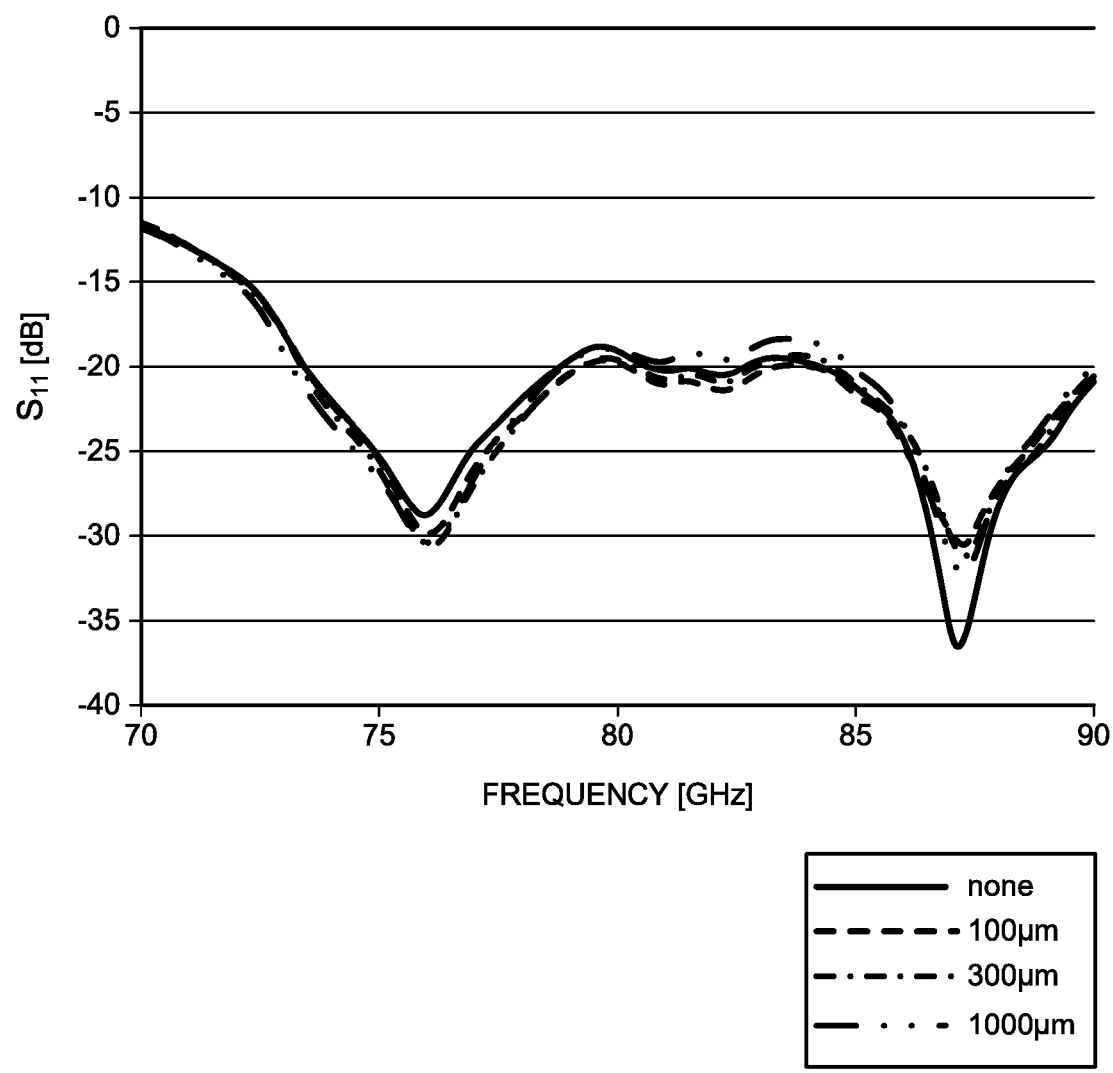
FIG. 30 is a diagram illustrating the relationship between the size and the reflectance (S11) of a protrusion.

FIG. 30 is a diagram illustrating a relationship between size D1 and reflectance (S11) of protrusions 315a. In FIG. 30, the horizontal axis represents the frequency [Hz] of the electromagnetic wave transmitted from antenna 312 and the vertical axis represents reflectance (S11) [dB].

Each graph in FIG. 30 is obtained by calculating the size D1 and reflectance (S11) of protrusions 315a by simulation by changing the frequency of the electromagnetic wave transmitted from antenna 312.

Each graph in FIG. 30 represents the following.

Solid line graph: reflectance in a mode without protrusions 315a Dotted line graph: reflectance in a mode in which size D1 of protrusions 315a is 100 μm.

Dash-dotted line graph: reflectance in a mode in which size D1 of protrusions 315a is 300 μm.

Dashed-two dotted line graph: reflectance in a mode in which the size D1 of protrusions 315a is 1000 μm.

As can be seen from FIG. 30, when size D1 of protrusion 315a is 100 μm or less, there is no great difference in the reflection characteristics of protrusions 315a between the mode with protrusion 315a and the mode without protrusions 315a. Therefore, if size D1 of protrusions 315a is 100 μm or less, it can be said that the decrease in output gain and reception gain caused by passing through protrusions 315a can be suppressed.

Figure 31:
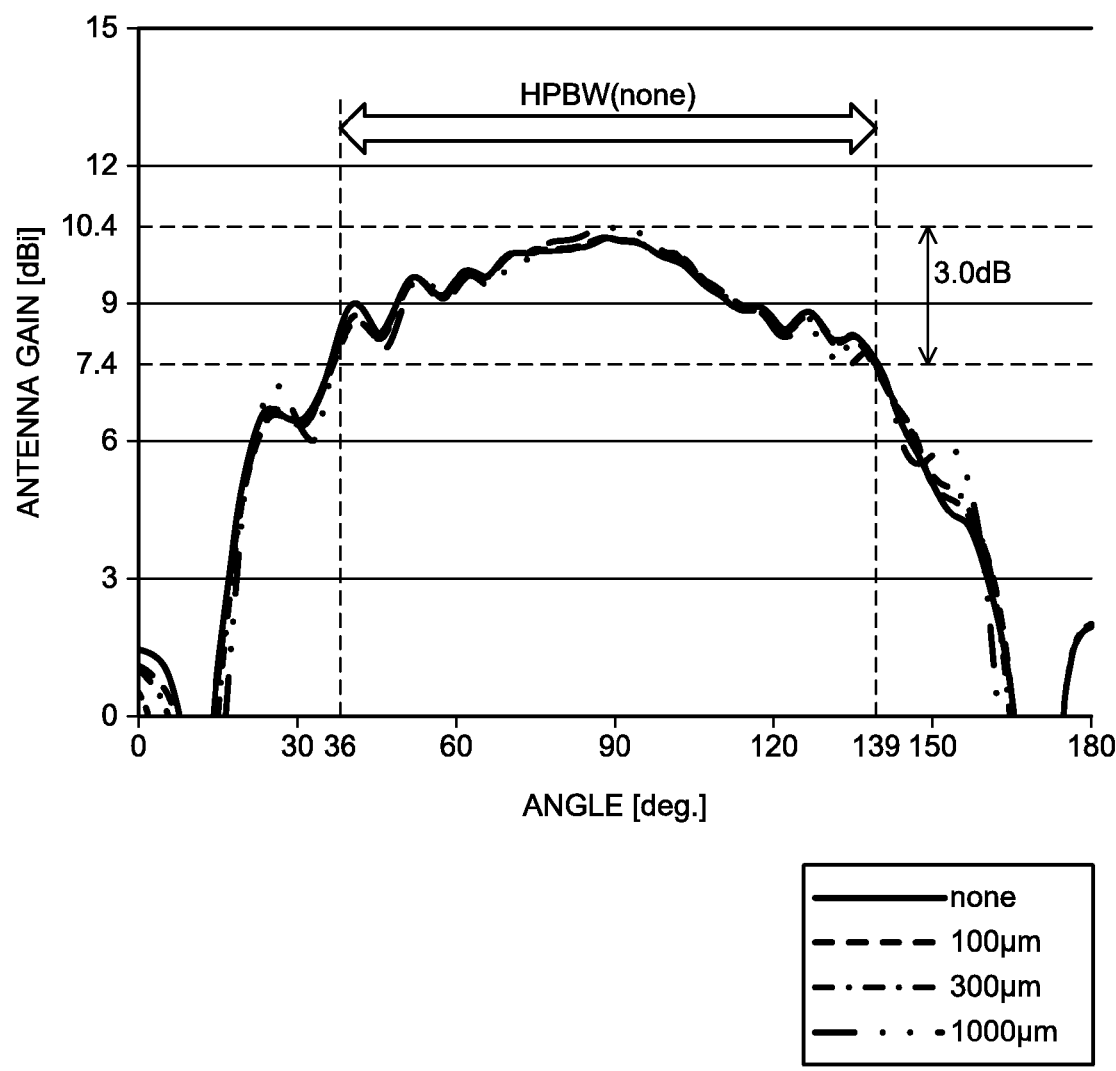
FIG. 31 is a diagram illustrating a relationship between the size of the protrusion and an antenna gain of the antenna.

FIG. 31 is a diagram illustrating the relationship between size D1 of protrusions 315a and the antenna gain of antenna 312. In FIG. 31, the horizontal axis represents the angle of the electromagnetic wave transmitted from antenna 312 (the position of 90 degrees corresponds to +X direction), and the vertical axis represents the antenna gain in antenna 312.

Each graph in FIG. 31 is obtained by changing the direction of the electromagnetic wave transmitted from antenna 312 (here, 80 GHz electromagnetic wave), and calculating the wave intensity (that is, antenna gain) of the reflected wave from the predetermined target, which is received by antenna 312 for each direction, by simulation.

Each graph in FIG. 31 represents the following.

Solid line graph: antenna gain in a mode without protrusions 315a

Dotted line graph: antenna gain in a mode in which the size D1 of protrusions 315a is 100 μm.

Dash-dotted line graph: antenna gain in a mode in which the size D1 of protrusions 315a is 300 μm.

Dashed-two dotted line graph: antenna gain in a mode in which the size D1 of protrusions 315a is 1000 μm.

As can be seen from FIG. 31, as size D1 of protrusions 315a increases, the half power beam width (HPBW) (here, the half power beam width of 3 dB) becomes narrower than that in the beam half width. The beam half width in each mode is as follows.

The beam half width in a mode without protrusions 315a: and 103 degrees.

The beam half width in a mode in which the size D1 of protrusions 315a is 100 μm: 103 degrees.

The beam half width in a mode in which the size D1 of protrusions 315a is 300 μm: 102 degrees.

The beam half width in a mode in which the size D1 of protrusions 315a is 1000 μm: 102 degrees.

From this result, in the case where size D1 of protrusions 315a is set to 100 μm or less, the radar performance equivalent to that in the case without protrusion 315a can be ensured. Note that, when size D1 of protrusion 315a is set to 300 μm to 1000 μm, the radar performance is not as good as the case where the size of protrusions 315a is 100 μm, but the reflection characteristic is sufficient for achieving the function of detection of an object.

[Effect of One Example]

As described above, antenna apparatus 310 of Embodiment 9 includes: radar housing 314; antenna 312 stored in radar housing 314 and configured to transmit an electromagnetic wave to the front through the window portion formed on the front face of radar housing 314 and receive the reflected wave; and cover member (dielectric lens in Embodiment 9) 315 disposed at the window portion of radar housing 314 and having the irregular structure on the front face.

Therefore, according to antenna apparatus 310 of Embodiment 9, adhesion of water droplets or the like (for example, snow, raindrops, mud, dirt, or the like) to the front face of cover member (dielectric lens in Embodiment 9) 315 may be suppressed by a Lotus effect of the plurality of protrusions 315a. In other words, adhesion of water droplets or the like to the vicinity of a radar aperture surface can be suppressed. Accordingly, decrease in output gain and decrease in reception gain caused by water droplets may be suppressed.

In particular, in antenna apparatus 310 according to Embodiment 9, dielectric lens 315 is mounted on the vehicle such that the front face thereof is exposed to the outside, and dielectric lens 315 also functions as a cover member for protecting antenna 312. Accordingly, antenna 312 can transmit and receive electromagnetic waves to and from the outside without interposing any member other than dielectric lens 315, and when transmitting and receiving electromagnetic waves in antenna apparatus 310, decrease in output gain or decrease in reception gain caused by water droplets or the like can be suppressed.

In particular, antenna apparatus 310 according to Embodiment 9 is formed as in-vehicle light apparatus U4 integrally with lamps 320a, 320b, and 320c. Therefore, the space for installation when mounting on is saved, which contributes to improvement in the design of the vehicle body.

Embodiment 10

Next, antenna apparatus 310 according to Embodiment 10 will be described with reference to FIG. 32. Antenna apparatus 310 according Embodiment 10 is different from Embodiment 9 in that a plurality of protrusions 315a having different sizes are formed on the front face of dielectric lens 315. Note that description of the structure in common with Embodiment 9 is omitted. (hereinafter, the same applies to the other embodiments).

Figure 32:
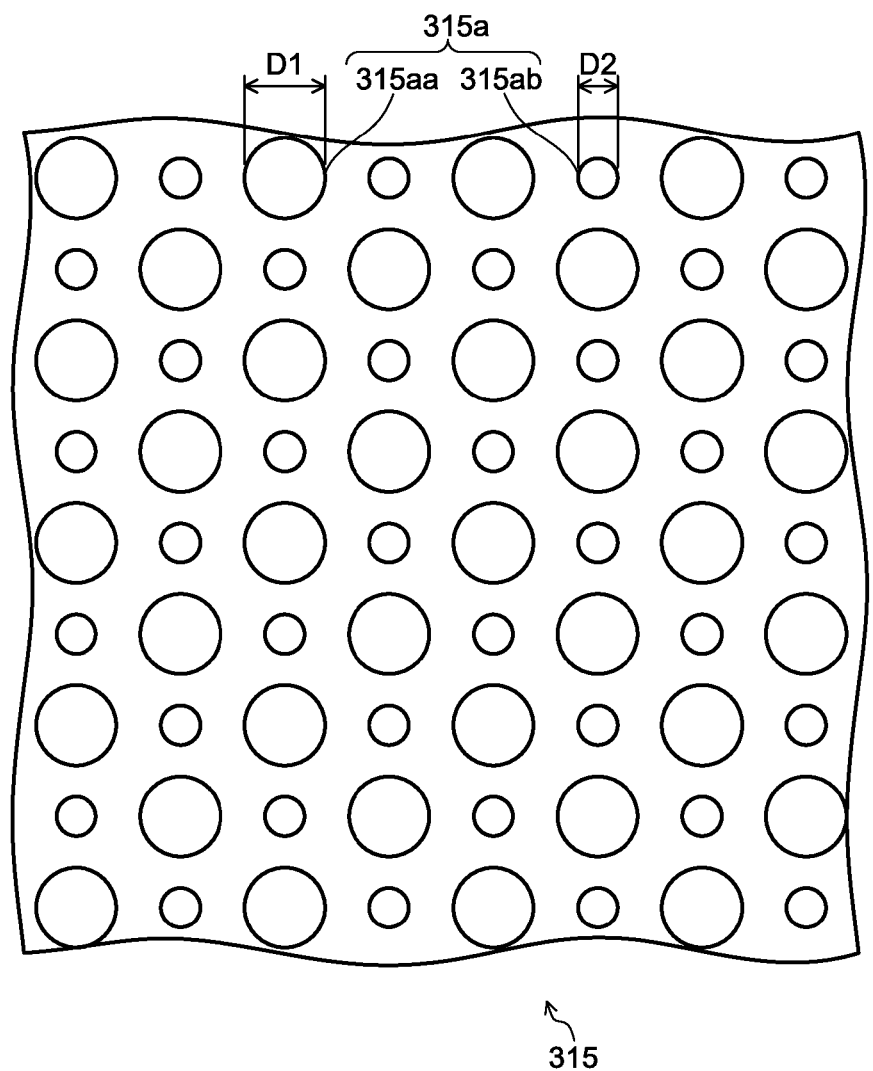
FIG. 32 is a sectional side view illustrating an example of the configuration of the antenna apparatus according to Embodiment 10.

FIG. 32 is a sectional side view illustrating an example of the configuration of antenna apparatus 310 according to Embodiment 10.

Dielectric lens 315 according to Embodiment 10 includes with first protrusions 315aa (protrusions 315a of size D1 in FIG. 32), and second protrusions 315ab (protrusions 315a of the size D2 in FIG. 32) which is smaller in size than first protrusion 315aa on the front face thereof.

Accordingly, the azimuth or frequency at which the output gain decreases caused by protrusions 315a can be dispersed from the specific azimuth and the specific frequency. Therefore, generation of a blind spot area in which detection of an object is impossible is suppressed, so that more preferable radar performances are achieved.

Although only two sizes are exemplified as the size of protrusions 315a, protrusions 315a having three or more different sizes may be provided. The size of protrusions 315a is also arbitrary.

Embodiment 11

Next, antenna apparatus 310 according to Embodiment 11 will be described with reference to FIG. 33. Antenna apparatus 310 according to Embodiment 11 is different from Embodiment 9 in that planar cover member 317, instead of dielectric lens 315, is disposed in front of antenna 312.

Figure 33:
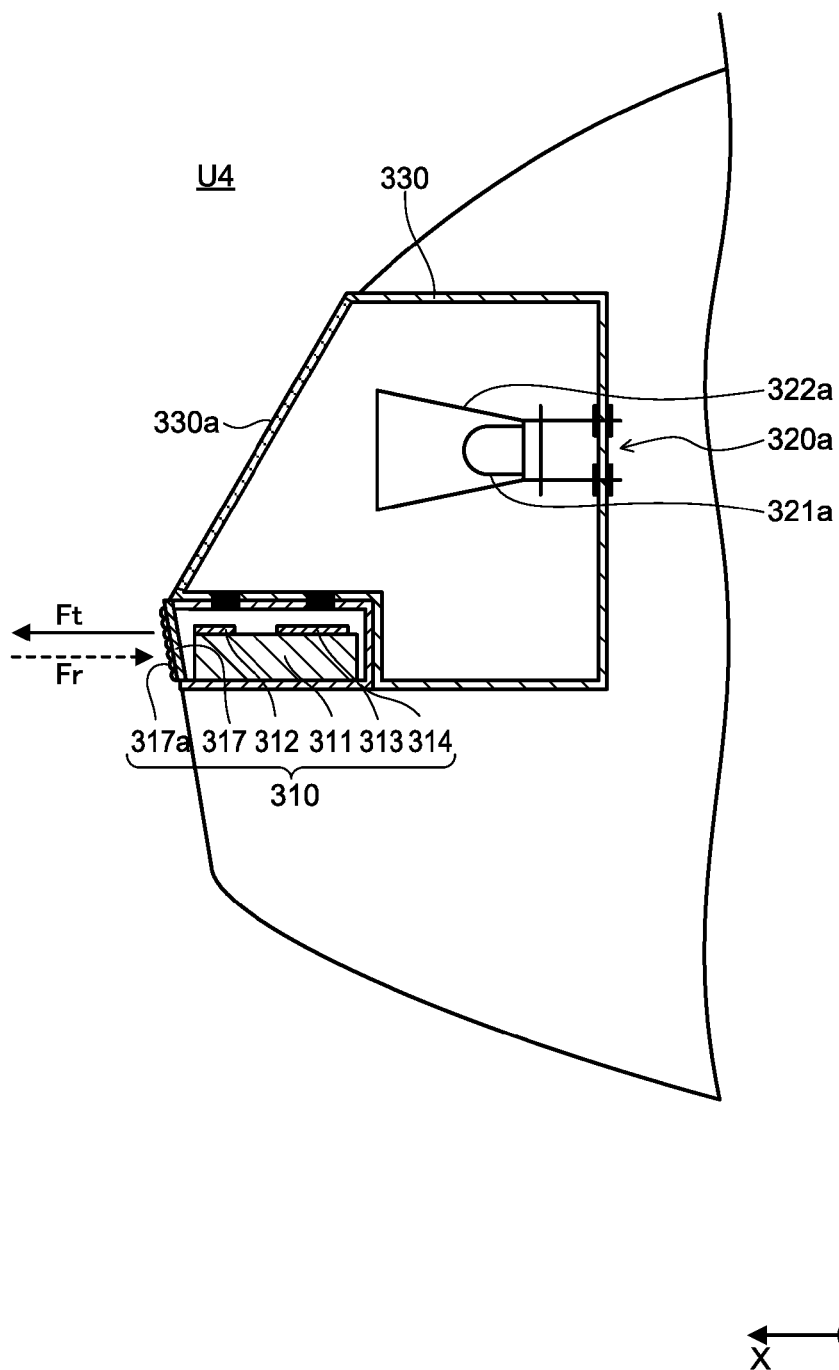
FIG. 33 is a sectional side view illustrating an example of the configuration of the antenna apparatus according to Embodiment 11.

FIG. 33 is a sectional side view illustrating an example of the configuration of antenna apparatus 310 according to Embodiment 11.

Cover member 317 according to Embodiment 11 is formed into a planar shape and has no function as a dielectric lens. However, similarly to dielectric lens 315 described in Embodiment 9, cover member 317 according to Embodiment 11 has an irregular structure on the front face. The irregular structure of cover member 317 is formed by a plurality of protrusions 317a as well as the irregular structure of dielectric lens 315 as described, for example, in Embodiment 9. Cover member 317 has a water repellent function on the front face thereof by the irregular structure.

Cover member 317 of Embodiment 11 has the front face having a shape in which an upper region is protruded forward than a lower region. Accordingly, water droplets or the like adhering to the front face of cover member 317 can be dropped to the lower side of cover member 317 more effectively.

Although Embodiment 11 has been described about a case of a planar shape, the present invention is not limited thereto, and a similar effect can be expected as long as the shape is such that at least the upper region protrudes toward forward than the lower region.

(Modified Modes)

The embodiments of the present invention are not limited to Embodiments 9 to 11 described above, and various modified modes are also conceivable.

In Embodiments 9 to 11 described above, various examples of the configuration of the light apparatus U4 have been described. However, it is needless to say that a combination of modes described in the respective embodiments may also be used.

In Embodiments 9 to 11 described above, semi-cylindrical lens is illustrated as an example of the shape of dielectric lens 315. However, examples of the shape of dielectric lens 315 include a dome-type lens, a double-sided convex lens, a ball lens, a Fresnel lens, or a combination thereof, or a concave lens and a combination thereof. In addition, as dielectric lens 315, a concave lens that diffuses an electromagnetic wave transmitted from antenna 312 may be applied.

In Embodiment 9 to 11 described above, the irregular structure formed of dome-shaped protrusions 315a is formed on the front face of dielectric lens 315 has been exemplified. However, the shape of protrusions 315a constituting the irregular structure is arbitrary, and may be formed by striped protrusions 315a instead of dome-shaped protrusions 315a. In this case, the size of protrusions 315a may be set to 1000 μm or less with reference to a longest distance between both ends of protrusions 315a in plan view.

Note that even when the configuration or the structure of antenna 312 or is changed specifically if the size is set to 100 μm or less, the influence on the antenna performance due to the irregular structure is negligible as a matter of course. However, in Embodiments 9 to 11 described above, the irregular structure of hemispherical shape has been described as an example. However, the present invention is not limited thereto, and the irregular structure may be any shape that can be expected to have a water-repellent effect with a size that does not cause degradation in performance of a millimeter wave radar, such as an elliptical shape, a rectangular shape, a triangular shape, or the like.

In Embodiments 9 to 11 described above, an end-fire array antenna is illustrated as an example of an antenna element constituting antenna 312. However, antenna 312 only needs to be made up of a conductor pattern formed on circuit board 311, and instead of the end-fire array antenna, a Yagi array antenna, a Fermi antenna, a post wall waveguide antenna, or a post wall horn antenna or the like are also applicable.

In Embodiments 9 to 11 described above, modes in which antenna apparatus 310 applied to in-vehicle light apparatus U4 have been described as an example of antenna apparatus 310. However, antenna apparatus 310 according to the embodiments of the present invention may be applied to those other than the in-vehicle light apparatus U4, and may be disposed solely at the position of, for example, a bumper member of the vehicle.

According to the antenna apparatus of one example of the present disclosure, it is possible to suppress decrease in output gain and decrease in reception gain caused by water droplets or the like adhering to the front face of the cover member.

An antenna apparatus according to an example of the present disclosure includes: a housing; an antenna stored in the housing and configured to transmit an electromagnetic wave to the front through the window portion formed on the front face of the housing and receive the reflected wave thereof; and a cover member disposed on the window portion of the housing and having an irregular structure on a front face thereof.

According to the antenna apparatus of an example of the present disclosure, the irregular structure is formed by a plurality of protrusions provided on the front face of the cover member.

According to the antenna apparatus of an example of the present disclosure, the plurality of protrusions each have a dome shape.

According to the antenna apparatus of an example of the present disclosure, a diameter of each of the plurality of protrusions is 1000 µm or less in plan view According to the antenna apparatus of an example of the present disclosure, the diameter of each of the plurality of protrusions is substantially $\lambda/40$ ($\lambda$ is the free-space wavelength of the electromagnetic wave) in plan view.

According to the antenna apparatus of an example of the present disclosure, the plurality of protrusions includes a first protrusion and a second protrusion having sizes different from each other.

According to the antenna apparatus of an example of the present disclosure, the cover member is a dielectric lens that condenses or diffuses the electromagnetic wave transmitted from the antenna.

According to the antenna apparatus of an example of the present disclosure, a front portion of the dielectric lens has a semi-cylindrical shape or parabolic cylindrical shape protruding toward the front.

According to the antenna apparatus of an example of the present disclosure, wherein the front face of the cover member is shaped such protruding forward in an upper region than in a lower region.

According to the antenna apparatus of an example of the present disclosure, the antenna includes an end-fire array antenna disposed on a circuit board.

According to the antenna apparatus of an example of the present disclosure, the antenna includes the plurality of end-fire array antennas arranged in an array along a direction orthogonal to the forward direction.

According to the antenna apparatus of an example of the present disclosure, the cover member is mounted on the vehicle with a front face exposed to the outside.

The in-vehicle light apparatus according to an example of the present disclosure includes the antenna apparatus described above.

While specific examples of the present invention have been described in detail above, these are merely examples and are not intended to limit the scope of the claims. Technologies described in the appended claims include various modified modes and changed modes of the examples illustrated above.

In addition, while various embodiments have been described herein above, it is to be appreciated that various changes in form and detail may be made without departing from the sprit and scope of the invention(s) presently or hereafter claimed.

This application is entitled and claims the benefit of Japanese Patent Application No. 2018-183699, filed on Sep. 28, 2018, Japanese Patent Application No. 2018-183702, filed on Sep. 28, 2018, Japanese Patent Application No. 2018-183711, filed on Sep. 28, 2018 and Japanese Patent Application No. 2018-183715, filed on Sep. 28, 2018, the disclosure of which including the specification, drawings and abstract is incorporated herein by reference in its entirety.

INDUSTRIAL APPLICABILITY

According to an in-vehicle light apparatus according to an example of the present disclosure, it is possible to suppress deterioration of radar performance caused by multiple reflections with an integrated radar and lamp configuration.

REFERENCE SIGNS LIST

U1 in-vehicle light apparatus
10 radar unit
11 circuit board
12 antenna
13 signal processing IC
20a, 20b, 20c lamp unit
21a, 21b, 21c light source
22a, 22b, 22c reflector
30 housing
30a front cover
40 garnish material
40a lens
U2 in-vehicle light apparatus
110 radar unit
111 circuit board
112 antenna
113 signal processing IC
114 separator
114a first extending portion
114b second extending portion
114c third extending portion
114d electromagnetic wave absorbing material
115 dielectric lens
120a, 120b, 120c lamp unit
121a, 121b, 121c light source
122a, 122b, 122c reflector
130 lamp housing
130a front cover
U3 in-vehicle light apparatus
210 radar apparatus
211 circuit board
212 antenna
213 signal processing IC
214 separator
215 dielectric lens (cover member)
220a, 220b, 220c lamp
221a light source 222a reflector
230 lamp housing
230a front cover
200 ECU
201 reflected wave intensity acquirer
202 weather information acquirer
203 lighting controller
U4 in-vehicle light apparatus
310 antenna apparatus
311 circuit board
312 antenna
313 signal processing IC
314 radar housing
315 dielectric lens
315 protrusions
317 cover member
320a, 320b, 320c lamp
321a light source
322a reflector
330 lamp housing
330a front cover

What is claimed:

1. A light apparatus mounted on a vehicle, comprising:
a lamp unit including:
   a first cover; and
   a light source that emits light through a first cover into a predetermined area including a first direction;
a radar unit provided on a lower side or an upper side of the lamp unit; and
a separator provided between the lamp unit and the radar unit, wherein
   the radar unit includes:
      a circuit board having a board surface arranged in a substantially horizontal state; and
      an antenna unit that transmits an electromagnetic wave in a range including a second direction different from the first direction and that receives a reflected wave from an object existing outside the vehicle, the antenna unit being arranged in the board surface.

2. The light apparatus according to claim 1, wherein the antenna is arranged between the reflector and the front cover.

3. The light apparatus according to claim 1, wherein the separator contains metal.

4. The light apparatus according to claim 1, wherein the separator contains carbon.

5. The light apparatus according to claim 1, wherein a thermal conductivity of the separator is higher than a thermal conductivity of the lamp unit.

6. The light apparatus according to claim 1, wherein the separator shields propagation of the electromagnetic waves.

7. The light apparatus according to claim 1, wherein the radar unit further includes a second cover in contact with the separator,
the radar unit is configured to transmit the electromagnetic wave to the range including the second direction via the second cover, and to determine whether or not a reflected wave from the second cover is equal to or higher than a predetermined value, and
the lamp unit is turned on the light source when the reflected wave from the second cover is equal to or higher than a predetermined value.

8. The light apparatus according to claim 7, further comprising:
a sensor that determines weather, wherein
the lamp unit turns on the light source when the sensor determines that there is snowfall.

9. The light apparatus according to claim 1, wherein the radar unit further includes a second cover in contact with the separator,
the radar unit is configured to transmit the electromagnetic wave to the range including the second direction via the second cover, and
an outside of the second cover has a plurality of protrusions.

10. The light apparatus according to claim 9, wherein a diameter of each of the plurality of protrusions is 1000 μm or less.

11. The light apparatus according to claim 9, wherein a diameter of each of the plurality of protrusions is $\lambda/40$ or less, and
the $\lambda$ is a free space wavelength of the electromagnetic wave.

12. The light apparatus according to claim 9, wherein the plurality of protrusions include protrusions having different diameters from each other.

13. The light apparatus according to claim 1, wherein the antenna is an end-fire array antenna.

* * * * *